US011072386B2

(12) United States Patent
James

(10) Patent No.: US 11,072,386 B2
(45) Date of Patent: Jul. 27, 2021

(54) STEERING APPARATUS FOR A VEHICLE

(71) Applicant: Kelvin James, Edmonton (CA)

(72) Inventor: Kelvin James, Edmonton (CA)

(*) Notice: Subject to any disclaimer, the term of this patent is extended or adjusted under 35 U.S.C. 154(b) by 337 days.

(21) Appl. No.: 16/356,153

(22) Filed: Mar. 18, 2019

(65) Prior Publication Data

US 2020/0298930 A1 Sep. 24, 2020

(51) Int. Cl.
| | |
|---|---|
| *B62K 21/00* | (2006.01) |
| *B62K 5/027* | (2013.01) |
| *B62K 23/06* | (2006.01) |
| *B62J 99/00* | (2020.01) |
| *B62M 9/00* | (2006.01) |
| *B62J 45/20* | (2020.01) |
| *B62M 1/14* | (2006.01) |
| *B62M 1/10* | (2010.01) |
| *B62M 1/12* | (2006.01) |

(52) U.S. Cl.
CPC .............. *B62K 21/00* (2013.01); *B62J 99/00* (2013.01); *B62K 5/027* (2013.01); *B62K 23/06* (2013.01); *B62J 45/20* (2020.02); *B62K 2204/00* (2013.01); *B62M 1/10* (2013.01); *B62M 1/105* (2013.01); *B62M 1/12* (2013.01); *B62M 1/14* (2013.01); *B62M 9/00* (2013.01)

(58) Field of Classification Search
CPC ........ B62K 21/00; B62K 5/027; B62K 23/06; B62K 2204/00; B62K 5/02; B62J 99/00; B62J 45/20; B62M 9/00; B62M 1/16; B62M 1/28; B62M 1/10; B62M 1/12; B62M 1/14
See application file for complete search history.

(56) References Cited

U.S. PATENT DOCUMENTS

| | | | |
|---|---|---|---|
| 2,152,518 A | 3/1939 | Wolff | |
| 2,940,322 A | 6/1960 | Uhing | |
| 3,046,801 A | 7/1962 | Pravel | |
| 3,443,443 A | 5/1969 | Spence | |
| RE27,711 E | 7/1973 | Steibel | |
| 4,203,328 A | 5/1980 | Deboynton | |
| 4,718,291 A * | 1/1988 | Wood | F16H 19/025 |
| | | | 74/216.3 |
| 10,011,321 B2 * | 7/2018 | Kohlheb | B62K 5/023 |
| 2003/0178807 A1 * | 9/2003 | Drymalski | B62M 1/14 |
| | | | 280/243 |
| 2011/0248466 A1 * | 10/2011 | Leslie | B62K 3/005 |
| | | | 280/252 |

* cited by examiner

*Primary Examiner* — Kevin Hurley
*Assistant Examiner* — Marlon A Arce
(74) *Attorney, Agent, or Firm* — Snell & Wilmer L.L.P.

(57) ABSTRACT

The apparatus comprises a rotary to variable linear converter which functions to steer a pivotable rotatable directional wheel of a vehicle.

The converter comprises a driven rotatable cylinder and a rotatable pivotable friction wheel pressed against the surface of the cylinder so that they rotate together. The friction wheel is slidably mounted on guide rods extending parallel to the cylinder surface so that the friction wheel can advance helically along the cylinder if angled relative to the cylinder axis. The friction wheel generates a lateral force which is used to apply torque to the directional wheel to turn it. The orientation of the friction wheel is varied and controlled by a digit-operated control lever operated by a rider of the vehicle.

6 Claims, 22 Drawing Sheets

(section C)

| Segments in the figure 8 | Lever action | Vehicle response | Converter mechanics |
|---|---|---|---|
| A begins<br>A<br>A<br>A ends | Hold in neutral position | Moving in a straight ahead direction. | FW is at 90 degrees to the cylinder axis. There is no helical path developed. FW holds steady in the middle of the cylinder. |
| B begins<br>B<br>B<br>B ends | Press on right end.<br>Keep holding.<br>Keep holding.<br>Satisfied with the turn. Return to neutral. | DW starts to pivot CW. Vehicle continues to turn sharper and sharper.<br>DW stops pivoting. | FW rotates < 90 degrees to the cylinder axis. A helical path is developed. FW moves to left end of cylinder. |
| C begins<br>C<br>C<br>C ends | Hold in neutral position | Turning at a steady rate without any change to the DW. | FW is at 90 degrees to the cylinder axis. There is no helical path developed. FW holds steady at the left side of the cylinder. |
| D begins<br>D<br>D<br>D ends | Press on left end.<br>Keep holding.<br>Keep holding.<br>Satisfied with going straight. Return to neutral. | DW starts to pivot CCW. Vehicle direction starts to straighten out.<br>DW stops pivoting. | FW rotates > 90 degrees to the cylinder axis. A helical path is developed. FW moves right.<br>FW holds steady. |
| E begins<br>E<br>E<br>E ends | Hold in neutral position | Moving in a straight ahead direction. | FW is at 90 degrees to the cylinder axis. There is no helical path developed. FW holds steady in the middle of the cylinder. |
| F begins<br>F<br>F<br>F ends | Press on left end.<br>Keep holding.<br>Keep holding.<br>Satisfied with the turn. Return to neutral. | DW starts to pivot CCW. Vehicle continues to turn sharper and sharper.<br>DW stops pivoting. | FW rotates > 90 degrees to the cylinder axis. A helical path developed. FW holds steady at the right side of the cylinder. |
| G begins<br>G<br>G<br>G ends | Hold in neutral position | Turning at a steady rate without any change to the DW. | FW is at 90 degrees to the cylinder axis. There is no helical path developed. FW holds steady at the right side of the cylinder. |
| H begins<br>H<br>H<br>H ends | Press on right end.<br>Keep holding.<br>Keep holding.<br>Satisfied with going straight. Return to neutral. | DW starts to pivot CW. Vehicle direction starts to straighten out.<br>DW stops pivoting. | FW rotates < 90 degrees to the cylinder axis. A helical path is developed. FW moves left.<br>FW holds steady. |

Time increasing →

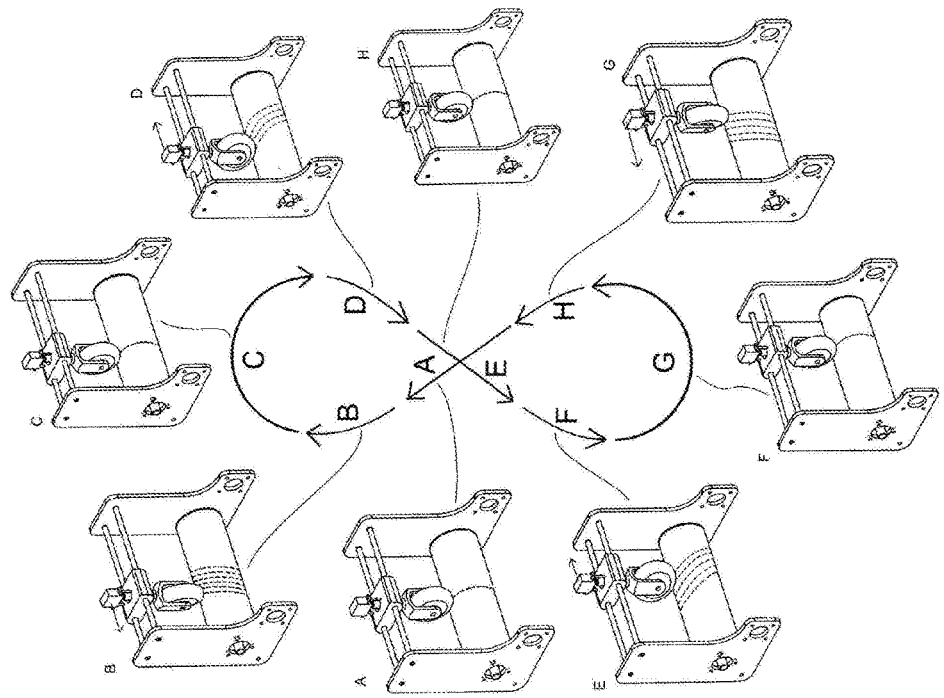

Fig. 2B (section A)

(section A)

(section A)

(section B)

(section B)

(section B)

(section B)

*(section B)*

(section B)

STEERING APPARATUS FOR A VEHICLE

TECHNICAL FIELD

An apparatus and method for steering a directional wheel of a vehicle, such as the front wheel of a tricycle.

BACKGROUND OF THE INVENTION

A vehicle normally has wheels, some of which are typically used for propulsion and some of which are used for steering. In the case of a wheel used for steering (referred to herein as a 'directional wheel'), the support assembly on which the rotatable wheel is mounted pivots around a relatively vertical axis, thereby enabling the vehicle to travel in directions other than a straight line, i.e. around curves or corners. This pivoting or turning motion has a direction, clockwise or counter-clockwise, and a rate of speed. The pivoting motion is controlled or steered by the vehicle user.

The present invention was developed in connection with steering the front directional wheel of an exercise tricycle manually propelled by a rowing-type system. It will be described below primarily in that context. However, it may find application for use with other manually powered vehicles as well.

The aforesaid tricycle was built as a prototype in connection with a program for developing exercise equipment for partly handicapped individuals. The prototype incorporated a pull cable and handle bar rowing-type system for driving the sprocket of a rear-mounted propulsion wheel.

A problem addressed was how to steer the front-mounted directional wheel. If the rider/user was using his/her arms to actuate the cable-bar assembly, they would be largely unavailable to steer. Otherwise stated, if propulsion and steering actions are to be simultaneously provided by the arms in the course of turning, one or both of these actions will be compromised. For example, propulsion may be compromised to allow the arms to achieve a full turning radius.

One objective of the present invention was therefore to conceive, design and implement an apparatus for effectively steering a directional wheel of a vehicle, such as a rowing-type tricycle, in a manner which frees the arms from steering.

SUMMARY

The present system is designed to enable the user of a manually powered, wheeled vehicle to steer a pivotable, rotatable directional wheel, preferably using his/her digits, such as the user's thumbs, to thereby turn the wheel in either of a clockwise or counter-clockwise direction at a controlled and variable rate. The system is further designed so as to amplify the relatively small, digitally actuated movements into larger turning movements of the directional wheel.

A steering system for a directional wheel of a vehicle has therefore been provided which integrates two assemblies, namely: a rotary to variable linear converter assembly (hereinafter referred to as "the converter assembly") and a digitally operated control assembly. The converter assembly functions to convert rotational drive provided by a rotating cylinder into a variable linear output of lateral force, which is used to apply torque to the directional wheel to turn it as needed for steering. The control assembly functions to translate digitally actuated steering movements provided by the user into steering control for the converter assembly in a form which is indicative of the digit movements.

In one exemplary detailed embodiment, the converter assembly comprises:

a support frame, mounted to the vehicle, for supporting other components of the converter assembly. The support frame may comprise a pair of brackets connected to the assembly supporting the directional wheel;

an elongate cylinder, rotatably mounted between and to the brackets, said cylinder having a rotative outer surface;

a guide means secured to and between the brackets so as to extend transversely to the direction of movement of the cylinder outer surface in constant spaced relation relative thereto—the guide assembly may comprise a pair of slide rods extending parallel to and being outwardly spaced from the cylinder outer surface;

a rotatable pivotable friction wheel held in contact with the cylinder outer surface for rotation therewith, the cylinder and friction wheel forming a coupled unit, the guide means preferably functioning to constrain the friction wheel so that it is normal to said outer surface—the guide means also serves to guide the friction wheel's movement along the cylinder's outer surface;

a slide assembly connected with the guide means for sliding movement therealong, said slide assembly connected with the directional wheel for turning said wheel;

the slide assembly comprising a pivotable stem, the stem having means connecting it with the friction wheel for turning thereof;

an actuation means, which may be a servo motor, connected to the stem for supplying controlled and variable angular position thereto, so as to turn and orient the stem and the friction wheel connected thereto; and a source of rotational drive associated with the vehicle and connected to the coupled cylinder/friction wheel unit for rotating the components of said unit;

whereby the cylinder may provide a rotative outer surface for the friction wheel to rotatably engage and travel on to thereby advance along a travel path around the cylinder, which path may repeatedly begin and end at the same position or may move laterally depending on the orientation of the friction wheel relative to the direction of movement of the rotative outer surface, so that in the case of lateral movement the friction wheel can advance helically along the cylinder's outer surface and variably produce lateral turning force to provide torque for turning the directional wheel or, in the case of the repeating path, provide torque to hold the directional wheel steady.

The converter assembly is operatively coupled with a digitally-operated control assembly comprising:

a control lever pivotally mounted between its ends to a support member carried by the vehicle, such as a cable pull bar, said control lever positioned so as to enable the user to digitally actuate it by pivoting the lever ends into an angled configuration or by maintaining them even; and means for monitoring the control lever movements and operating the actuation means to cause said actuation means to provide angular positioning, indicative of the movements, to the stem for turning the friction wheel.

In broad concept, a steering system for a directional wheel is provided wherein a rotatable, pivotable friction wheel, constrained and guided so as to be positioned normal to the cylinder outer surface it runs on, is combined with digitally-operated means adapted to vary or turn the friction wheel around its pivot axis and thereby produce lateral movement thereof. This lateral movement is controlled and used to provide steering of the directional wheel. A system is therefore provided in which small digitally-actuated movements of a user-accessible control lever, requiring minimal input force for operation, can control and vary the direction, extent and rate of movement of the friction wheel and consequential turning of the directional wheel across a relatively wide range of movement. In addition, power provided by the forward movement of the vehicle is used to rotationally drive the system.

A continuum of control lever movements involving direction, extent and rate of movement is utilized to provide dynamic control of steering. Interlaced into this continuum, a neutral or even lever position may be used to provide intervals of static control wherein steering occurs in a straight ahead direction or along a constant curve.

The specific embodiment described is characterized by the following features:
- the direction of the lever movement controls the direction of movement of the friction wheel;
- the angular magnitude of the lever movement controls the rate of movement of the friction wheel;
- the angular rate of lever movement controls the acceleration of movement of the friction wheel; and
- the speed of the vehicle modifies the rate and acceleration of movement of the friction wheel.

In one aspect of the invention, a system is therefore provided for steering a rotatable and pivotable directional wheel of a vehicle, comprising:
- a rotary to variable linear converter assembly comprising a rotatable cylinder, having a rotative outer surface, and a rotatable pivotable friction wheel positioned in contact with said outer surface so that they rotate together as a coupled assembly;
- said converter assembly further comprising guide means extending lengthwise of the cylinder in constant spaced arrangement and a slide assembly slidable along the guide means, said slide assembly having a rotatable stem connected with the friction wheel for pivotably varying said friction wheel's orientation;
- said slide assembly and friction wheel thereby forming a laterally slidable unit which is connected with the directional wheel for steering it;
- means for connecting said coupled assembly with a source of rotational drive associated with the vehicle; and
- digitally controlled means for actuating rotation of the stem to vary the friction wheel orientation for the purpose of steering.

In another aspect, a method for steering a rotatable and pivotable directional wheel of a vehicle is provided, comprising:
- generating a lateral turning force using a rotary to variable linear converter assembly comprising a rotating cylinder having an outer surface and a laterally movable, constrained, pivotable and rotatable friction wheel in contact with said outer surface and adapted to reciprocate thereon;
- digitally controlling and varying the angularity of the friction wheel relative to the direction of movement of the cylinder outer surface to turn or hold steady the friction wheel so that it advances along the rotating cylinder or remains stationary and thereby produces the turning force; and
- applying the turning force generated to turning the directional wheel.

DESCRIPTION OF THE DRAWINGS

FIG. 2b is an illustration of a FIG. 8 path followed by the vehicle in association with the example described—DW indicates directional wheel, CW indicates clockwise, CCW indicates counter-clockwise, and FW indicates friction wheel;

DESCRIPTION OF THE PREFERRED EMBODIMENT

In general

Figure 5:
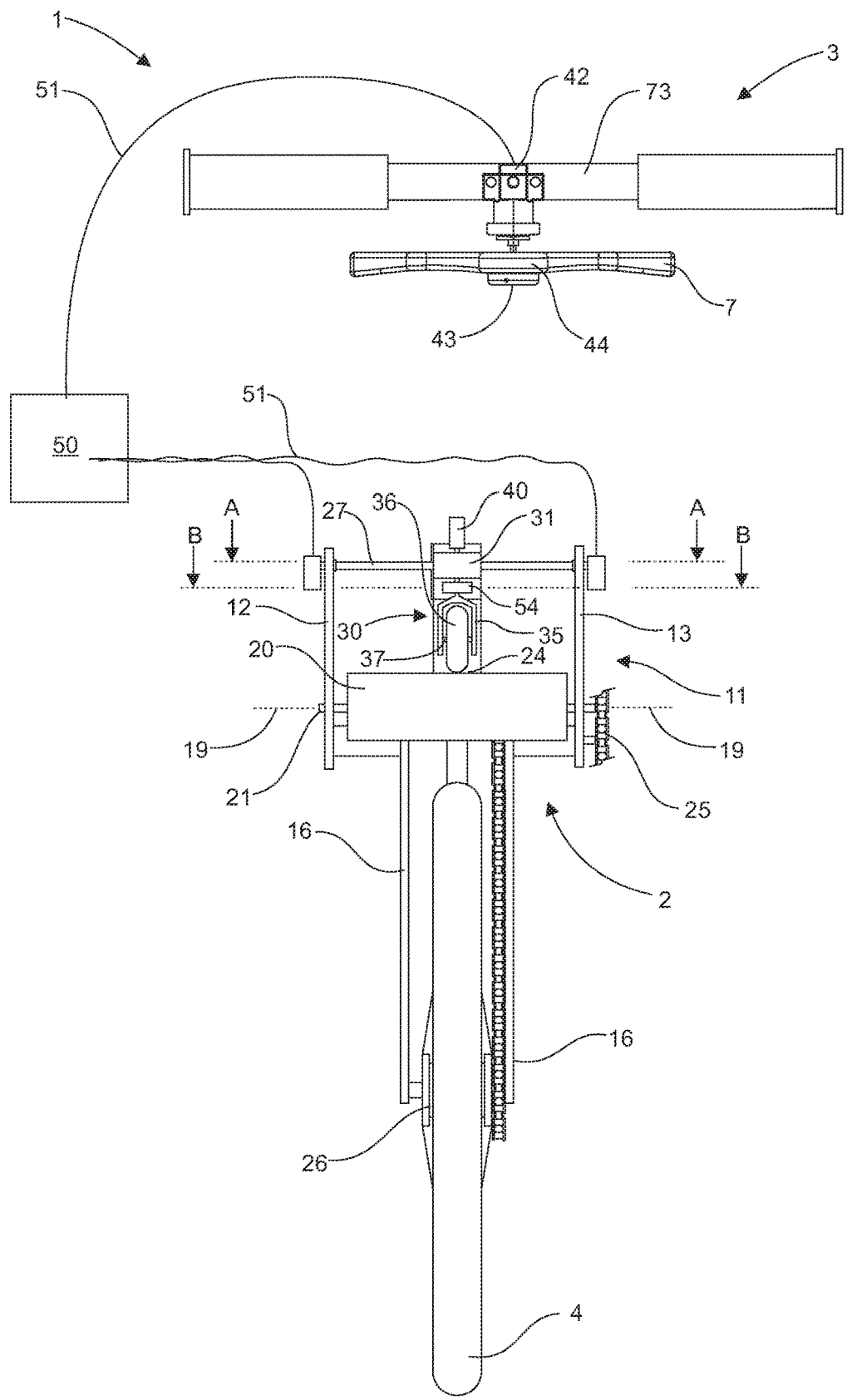
FIG. 5 is a front view of the steering system of FIG. 1 mounted on the vehicle showing cutting planes A and B.

As previously stated, the steering system 1 of the present invention comprises a rotary to linear converter assembly 2 working in conjunction with a digitally-operated control assembly 3. These elements are illustrated in an operatively connected condition in FIGS. 5 and 5a. They cooperate to steer the front directional wheel 4 of a manually powered tricycle 5 in response to short thumb movements applied by the user 6 to a pivoting control lever 7. The system 1 functions to turn the directional wheel 4 in time response to small control lever movements in a relatively broad manner, thereby providing variable amplification.

The Converter Assembly

Figure 1:
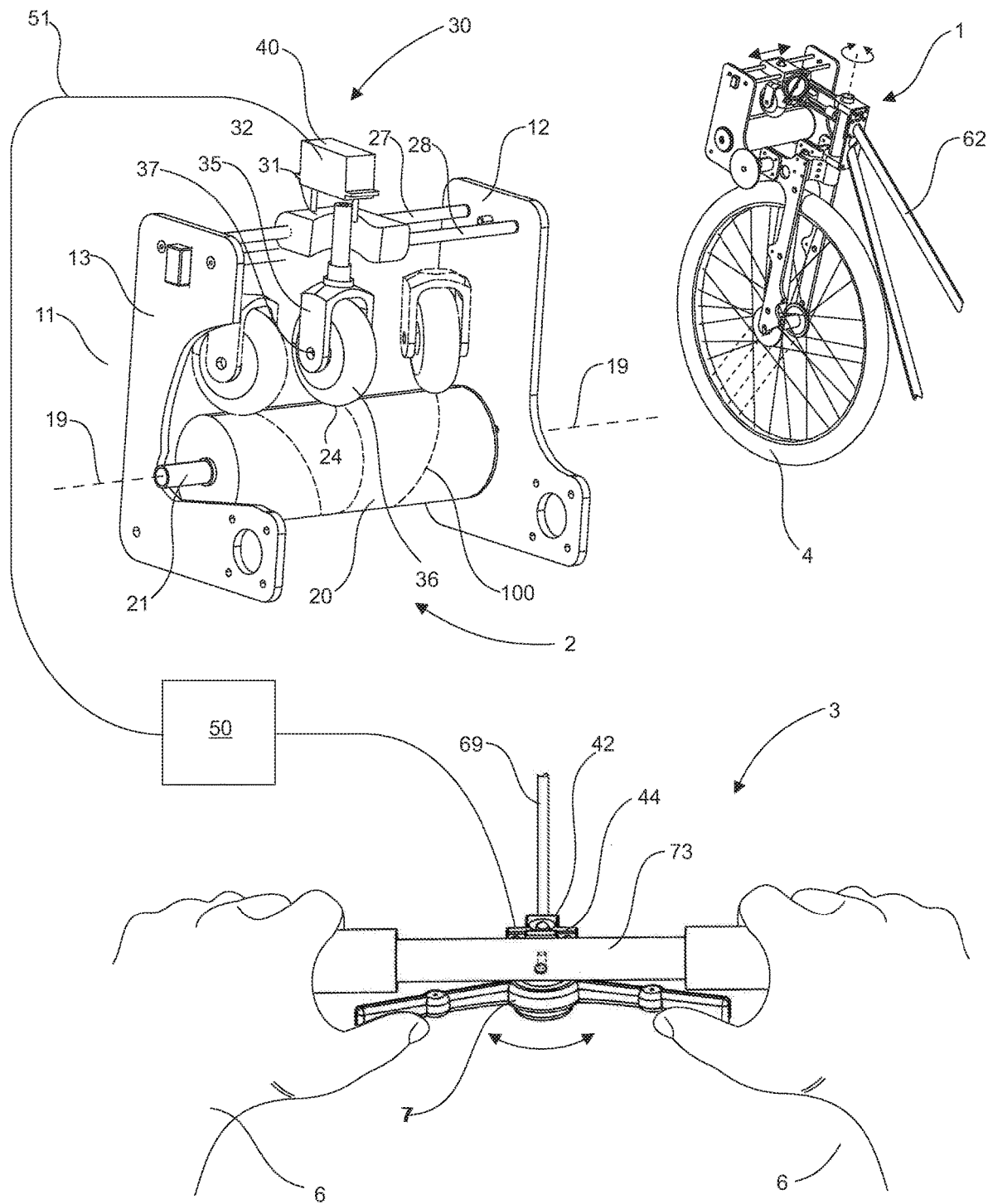
FIG. 1 is a perspective schematic illustration showing the steering system, with some cutaways showing the components and arrows and dotted lines indicating direction of motion.
Figure 3:
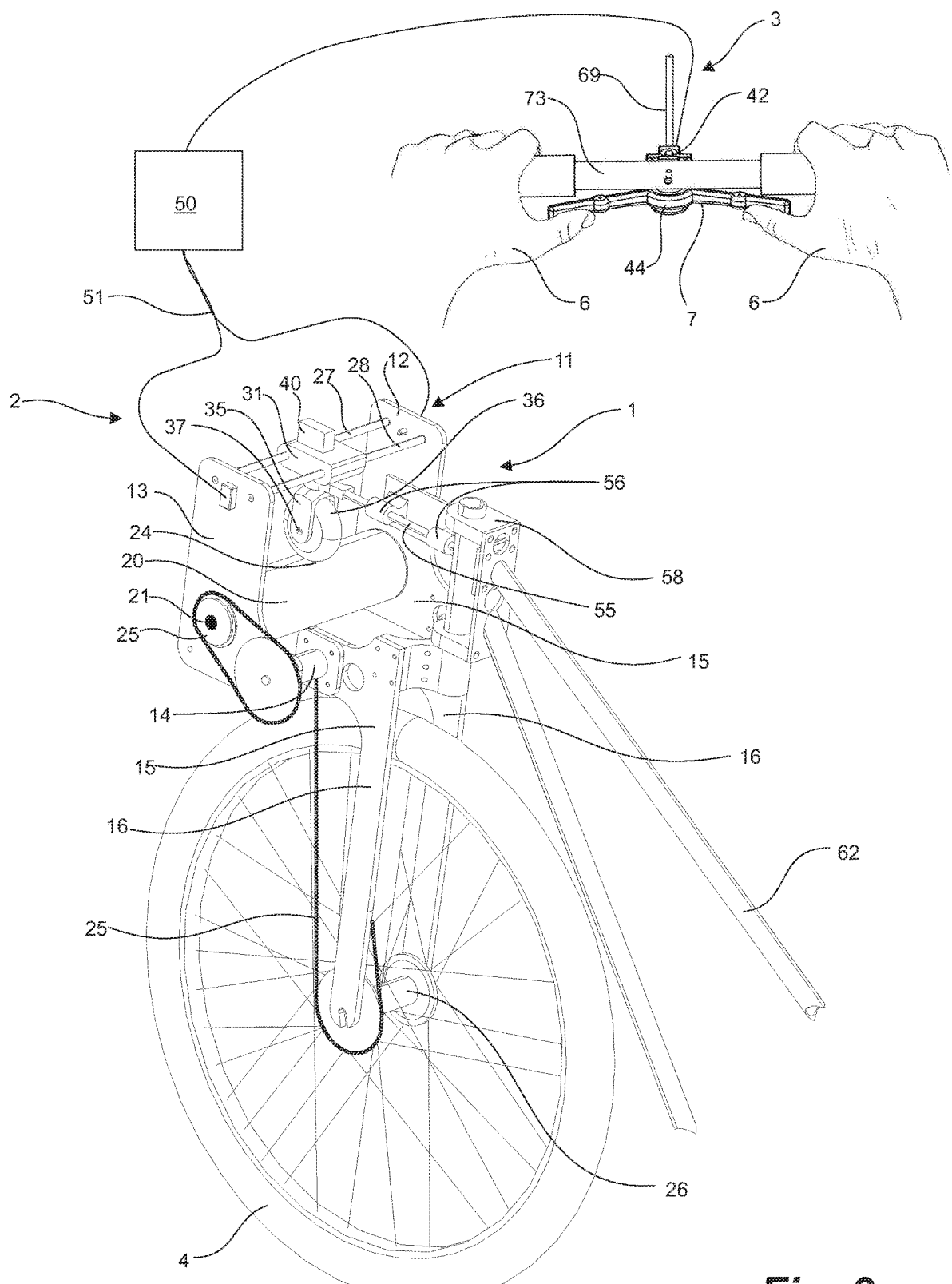
FIG. 3 is a perspective view showing the steering system of FIG. 1 mounted over the directional wheel of a vehicle.
Figure 4:
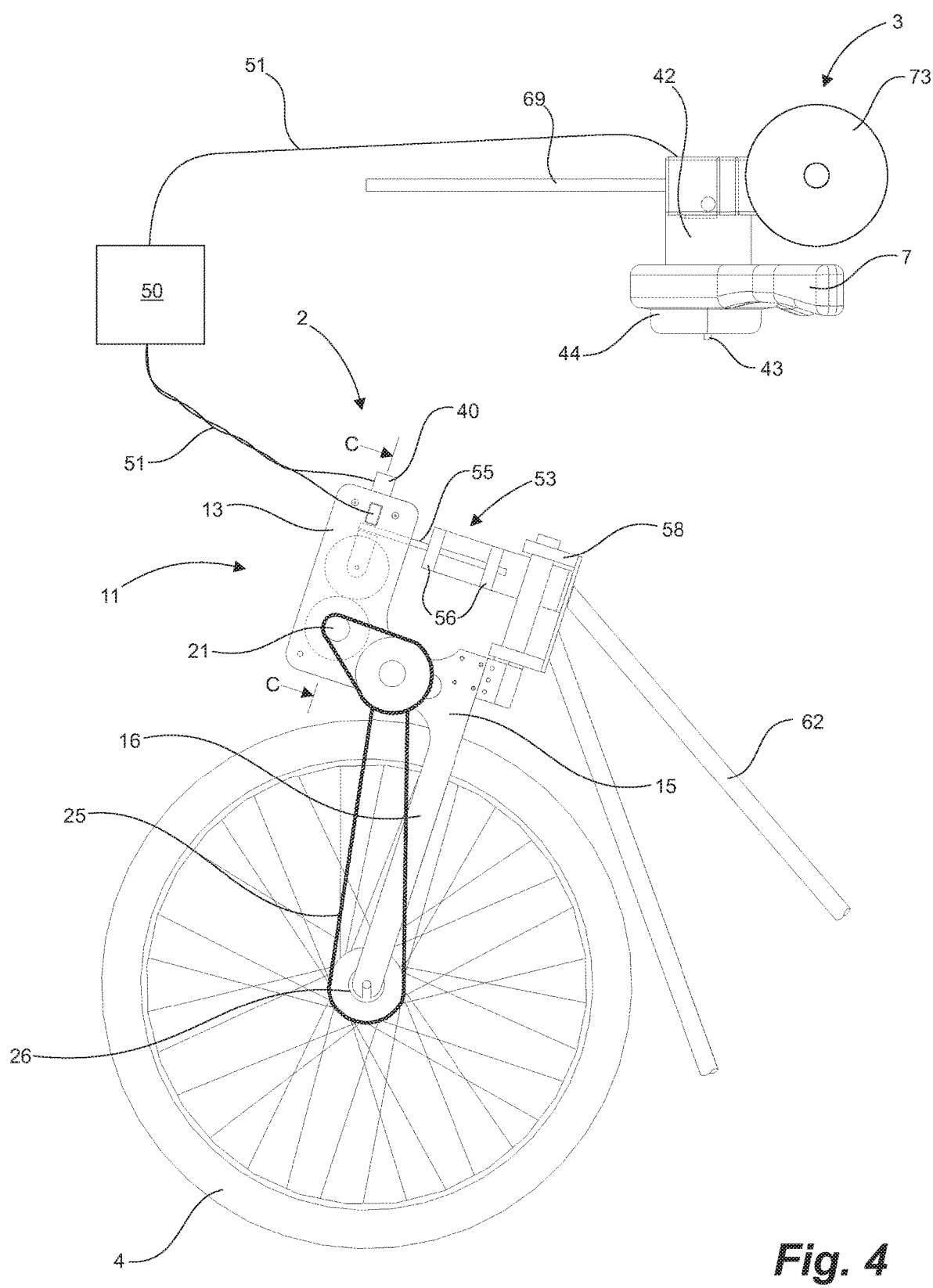
FIG. 4 is a side view showing the steering system of FIG. 3, including the rotational drive means showing cutting plane C.

Having reference to FIGS. 1, 3 the illustrated converter assembly 2 comprises a support frame 11 formed by a pair of parallel brackets 12, 13. The brackets 12, 13 are secured to a crosspiece 14 forming part of a forwardly projecting extension 15 of the tricycle fork assembly 16. The fork assembly rotatably supports the directional wheel 4 and pivots on column 58, thereby providing steering. The support frame 11 serves to mount the converter assembly componentry to the tricycle 5. In the embodiment shown, the converter assembly 2 is positioned to extend transversely over the tricycle's directional wheel 4.

An elongate cylinder 20 is rotationally mounted to and extends between the frame brackets 12, 13. It is supported on a longitudinal axle 21 journaled in bearings 22, 23 which are mounted in the frame brackets 12, 13. The cylinder 20 provides a rotative outer surface 24.

The cylinder 20 is rotationally driven by a source of rotational drive associated with the vehicle 5. For example, a chain and sprocket assembly 25 is connected to and between the hub 26 of the rotating directional wheel 4 and the cylinder 20. It functions to rotatably drive the cylinder when the vehicle is advancing.

A guide assembly 8, comprising a pair of linear guide rods 27, 28, is connected between and to the frame brackets 12, 13. The guide rods 27, 28 extend parallel to and in constant spaced relation relative to the longitudinal rotative outer surface 24 of the cylinder 20. They extend perpendicularly relative to the direction of rotational movement of the cylinder outer surface 24 and serve to maintain a slide assembly 30 moving therealong in a constant, outwardly spaced relation relative to said cylinder surface.

The slide assembly 30 comprises a body 31 slidably mounted on the guide rods 27, 28 by bearings 29 for rectilinear movement therealong.

A downwardly projecting, pivotable stem 32 extends from the slide body 31 and is supported for rotation therein by bearings 33. At its lower end, the stem 32 has a fork 35 rotatably supporting a friction wheel 36. The friction wheel 36 is mounted on an axle 37 and is supported in bearings 38 carried by the fork 35. The stem 32 is aligned normal to the cylinder's rotative outer surface 24 and is positioned so as to press the rim of the friction wheel 36 firmly against said outer surface.

In summary, the stem 32 is associated with the slide assembly 30, moves with it and is connected with the friction wheel 36. The stem 32 serves to turn and orient the friction wheel 36. The guide assembly 8 preferably guides friction wheel 36 perpendicularly to the direction of movement of the cylinder's rotative outer surface 24. It frictionally engages the cylinder's outer surface 24 and therefore will rotate with it as a rotationally coupled unit.

A servo motor 40 is mounted to the body 31 of the slide assembly 30. The motor's output shaft 77 is operatively connected to the stem 32 so as to turn it. When actuated, the servo motor 40 functions to provide controlled angular positioning or rotation to the stem 32 and thereby turns and angles the rim of friction wheel 36 relative to the direction of movement of the rotative outer surface 24. When so angled and rotating, the friction wheel 36 will advance laterally along a helical path on the rotating outer surface 24 of the cylinder 20. This is illustrated in broken lines in FIG. 1. The servo motor 40 therefore serves as part of an actuation means for providing variable and controlled angular position to the stem 32 and friction wheel 36 to turn and orient said wheel.

As shown in FIG. 1, the rolling path of contact between the friction wheel 36 and the cylinder 20 repeatedly begins and ends at the same position when the rim of friction wheel 36 is parallel to the direction of movement of the rotative outer surface 24. In this circumstance, friction wheel 36 generates lateral force providing torque to hold the directional wheel 4 steady either in a straight-ahead position or in a constant curve position.

When the rim of friction wheel 36 is angled relative to the direction of movement of the rotative outer surface 24, the rolling path of friction wheel 36 is helical in nature. When so rotating, the angled friction wheel 36 causes the slide body 31 to move rectilinearly along the guide rods 27, 28; the friction wheel 36 thereby generates lateral force on cylinder 20 (as indicated by the arrows in FIGS. 8, 13, 14, 16, 17) which produces torque for turning the directional wheel 4 in the course of steering the vehicle. The direction of movement of the slide body 31 will dictate whether the directional wheel 4 turns clockwise or counter-clockwise.

The rate of the sliding movement of the slide body 31 along the guide rods 27, 28 is controlled by the magnitude of the angular position of the friction wheel 36 and by the rate of driven rotation of the cylinder 20. The direction of the angular positioning of the servo motor 40 output causes the friction wheel 36 to move laterally in either the left or right direction.

The linear movement of the slide body 31 along the guide rods 27, 28 is converted to circular movement applied with torque to turning of the directional wheel 4 by use of a telescopic coupling 53. More specifically, a collar 54, which encircles the stem 32, is provided at the front end of a shaft 55. The shaft 55 slidably extends through linear bearings 56 mounted rigidly to the vehicle frame 62 and directional wheel column 58. The collar 54 contains bearing races 59 connecting the stem 32 and collar 54. This arrangement enables the stem 32 to rotate freely within the collar 54 under impetus from the motor 40, so as to pivot the friction wheel 36 and provide lateral turning force on the rotative outer surface 24 of the cylinder 20; the slide body 31 moves along the cylinder 20 left or right, thereby turning the fork assembly 16 and the directional wheel 4 attached to it.

In the operation of the converter assembly 2, the following features and actions are involved:

the support frame 11, guide rods 27, 28, slide assembly 30 and stem 32 combine to constrain and position the friction wheel 36 in frictional engagement with the rotating cylinder's outer surface 24, so that the friction wheel 36 and cylinder 20 rotate together as a unit and provide rotational input to the converter assembly 2;

the slide assembly 30 and guide rods 27, 28 enable the rotating friction wheel 36, when angled, to advance helically around the rotating cylinder 20;

if the friction wheel 36 is angled, the telescopic coupling 53, connecting the moving friction wheel 36 and slide assembly 30 with the directional wheel column 58, communicates a lateral force, generated by the interaction between the friction wheel 36 and the moving cylinder 20, to the fork assembly 16 and the directional wheel 4 in the form of applied torque, thereby turning the directional wheel 4—this is illustrated in FIGS. 8, 13, 14, 16 and 17;

the friction wheel 36 is connected to the pivotable stem 32 and therefore their orientation can be varied by aligning torque applied to them by the servo motor 40; and as a consequence, a small aligning torque applied to the stem 32 can vary the angular position or orientation of the friction wheel 36 to thereby control the direction, velocity and acceleration of the friction wheel movement along the cylinder 20 and produce the relatively large force needed to turn the directional wheel 4—this is illustrated in FIGS. 8, 13, 14, 16 and 17.

In summary, a converter assembly 2 is provided which can convert rotational input into variable linear and lateral force. The force is utilized to apply torque to steer the directional wheel 4. The elongate and lengthy nature of the cylinder 20 promotes amplification.

The Control Assembly

The control assembly 3 is operatively coupled with the converter assembly 2 to provide angular position input to the converter's stem 32.

It is intended, as a preferred outcome, to turn the friction wheel 36 at the same rate, through the same angle and in the opposite direction as the rate, angle and direction input digitally applied to the control lever 7 by the user 6. This is accomplished by the illustrated control assembly 3, as shown in schematic FIG. 5a.

Figure 5A:
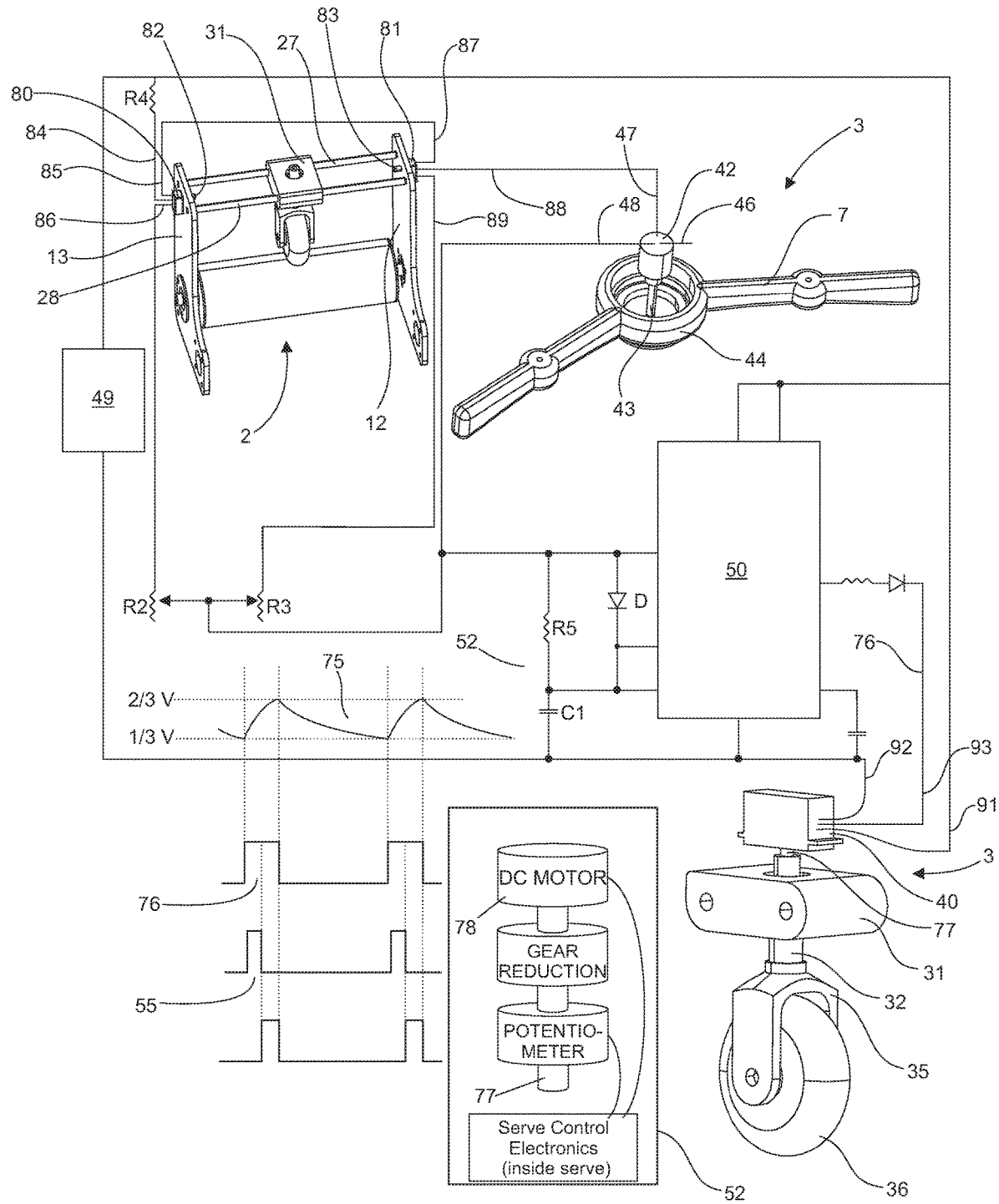
FIG. 5a is a mechatronic illustration of the control assembly.
Figure 6:
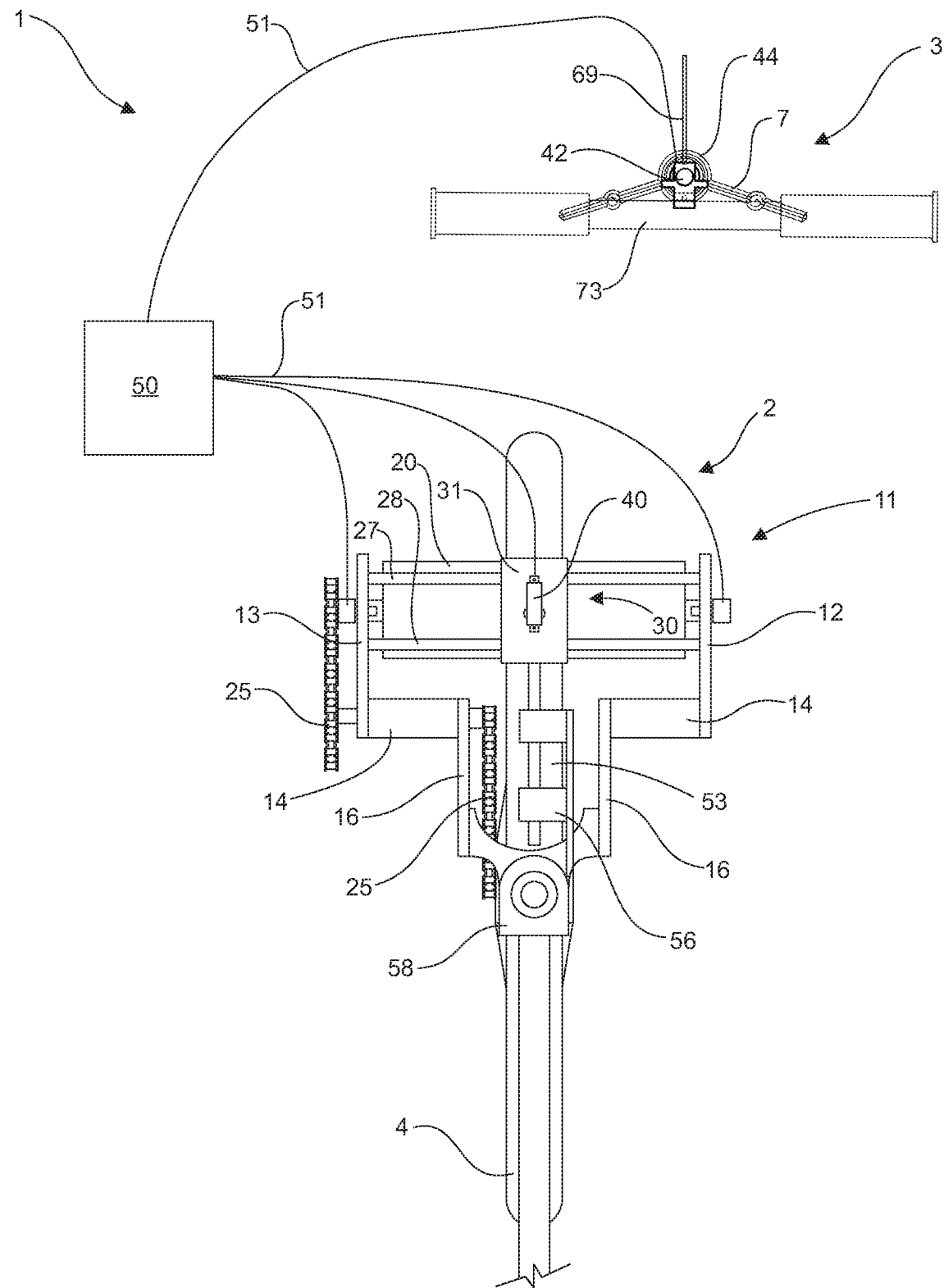
FIG. 6 is a top view illustration of the steering system mounted on the vehicle.
Figure 7:
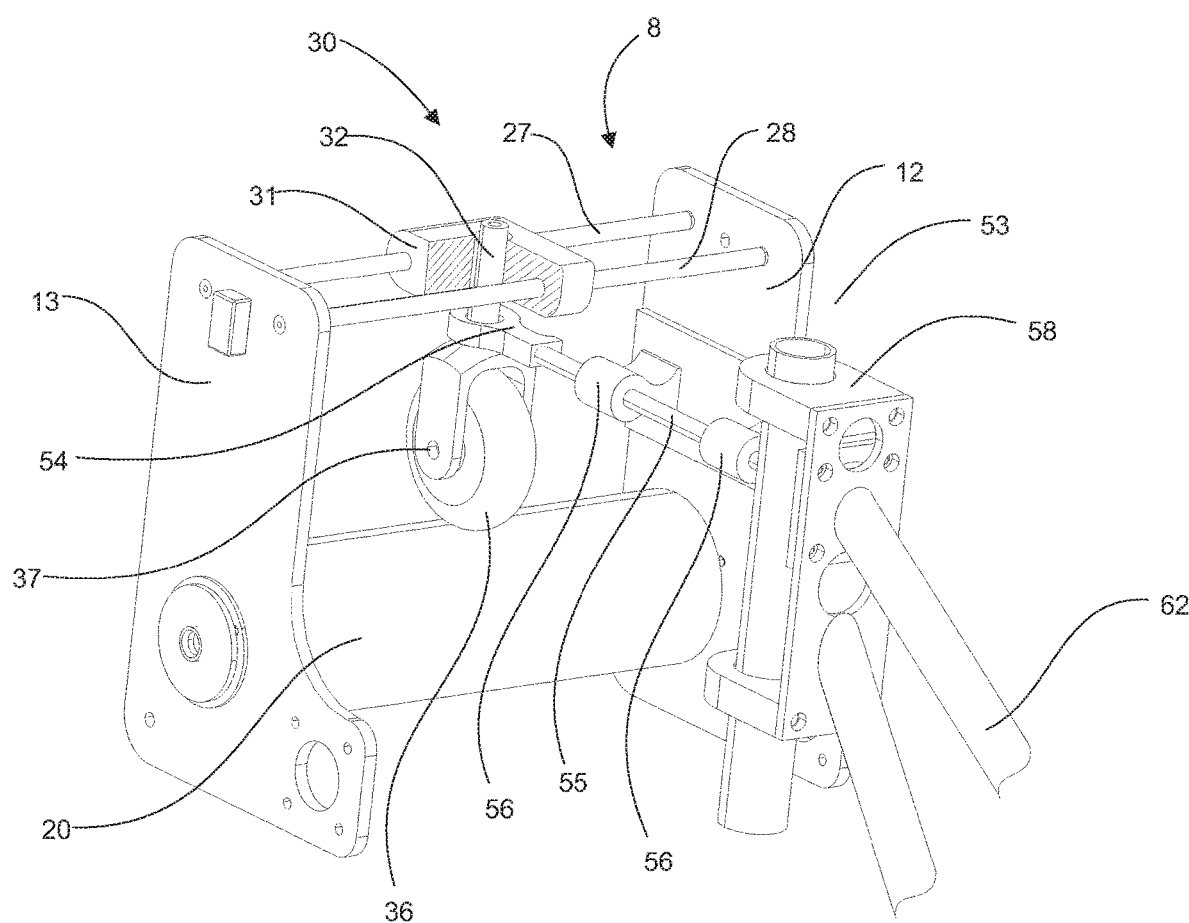
FIG. 7 is a partial perspective illustration of the telescopic coupling connecting the friction wheel to the vehicle.

Having reference to FIG. 5a, a rotary potentiometer 42 is provided. The potentiometer's rotary shaft 43 is connected with the pivoting control lever 7 by a strut 44, so that movements by the control lever 7 are transmitted to the potentiometer shaft 43 through the strut 44 and are reproduced thereby.

As shown in FIG. 5a, limit switches 80, 81 are mounted on the frame brackets 12, 13 and serve to provide means for indicating when slide body 31 has reached the end of travel along guide rods 27, 28. When the slide body 31 has reached the end of the travel on the left, button 82 is pressed and when it comes to the end of travel on the right, button 83 is pressed. Button 82 activates limit switch 80 and button 83 activates limit switch 81.

The limit switches 80, 81 provided have single throw double pole (SPDT) contacts. Left limit switch 80 and right limit switch 81 each have three terminals 84, 85, 86 and 87, 88, 89 respectively. When the slide body 31 is not pressing on button 82 or 83, terminals 84 and 85 are connected together and terminals 87 and 88 are connected together and terminals 86 and 89 are not connected. When slide body 31 is pressing on left button 82, terminals 84 and 86 are connected together and terminal 85 is not connected. When slide body 31 is pressing on right button 83, terminals 87 and 89 are connected together and terminal 88 is not connected.

The potentiometer 42 has three terminals 46, 47 and 48. A battery 49 is provided to apply battery voltage through resistor R4, terminals 84 and 85 of limit switch 80, terminals 87 and 88 of limit switch 81, and terminal 47 of the potentiometer 42. A voltage on terminal 48, which varies when potentiometer shaft 43 rotates, passes through diode D and begins to charge capacitor C1, increasing the voltage on it, through a period of time. The variable voltage is indicative of the angular position of the control lever 7 and changes the amount of time required to store energy in capacitor C1. A 555 astable oscillator circuit 50 provides means to charge and discharge the capacitor C1, to thereby produce a saw-tooth voltage profile 75 and a pulse width modulated (PWM) control signal 76, as illustrated in FIG. 5a. The on-time of the PWM control signal 76 is indicative of the angular position of control lever 7.

A servo motor 40, available from HITEC RCD and designated model HS-82MG, is utilized. The servo motor 40 has three terminals 91, 92 and 93 connected to the oscillator circuit 50. Battery 49 provides a fixed voltage to terminal 91 and ground to terminal 92. Terminal 93 is connected to PWM control signal 76. Included inside the servo motor 40 is a "proportional control closed loop" system providing means to precisely position the motor's angular output shaft 77 to a desired angle. Typically, a PWM control signal 55 indicative of the angle of the output shaft 77 is provided by internal circuitry ranging from 0.9 milliseconds to 1.5 milliseconds "on time". Internal circuitry is provided to calculate the difference between the on-time of the PWM control signal 55 and the on-time of the servo PWM signal 76. The difference powers the internal DC motor 78 in a direction to reduce the difference to zero. A large difference results in rapid rotation of the DC motor 78 while a small difference results in slower rotation achieving proportional control and precise positioning of the angle of the output shaft 77 of servo motor 40.

The limit switches 80 and 81 provide a means to override the user control when slide body 31 moves to the left or right limits. In normal operation, without either button 82, 83 pressed, control lever 7 provides control of the angle of friction wheel 36. When slide body 31 moves to the left, resistor R2 controls the angle of the friction wheel 36. When slide body 31 moves to the right, resistor R3 controls the angle of the friction wheel 36. Resistors R2 and R3 are manually adjusted to always move slide body 31 away from the left or right limits.

As previously stated, the servo motor 40 is rotationally coupled, through its output shaft 77 connection with the stem 32, to the friction wheel 36.

In summary, the pivotal position of the control lever 7 is reproduced by the friction wheel 36 through the workings of the components of the control assembly 3. The reproduction can occur at a ratio of 1 to 1 or another suitable ratio so as to accurately pivot the friction wheel 36.

Operation

In the course of operation, timed digit manipulation of the control lever 7 actuates the steering system 1 to control and vary the direction, extent and rate of turning of the directional wheel 4.

This is accomplished by the components of the control assembly 3 working together in series to produce an angular position of the servo motor output shaft 77 that controls and directs the operation of the converter assembly 2 to provide steering of the directional wheel 4.

In greater detail, the following steps are practiced by the described embodiment:

thumb manipulation of the pivotable control lever 7 provides mechanical linear input to the ends of the lever, to thereby produce mechanical rotary output;

the rotary output of the control lever 7 is mechanically coupled to the input shaft 43 of the rotary potentiometer 42, so that the potentiometer functions to effect a conversion of the lever rotary output to an output of voltage potential. The relationship of the potentiometer input/output conversion produces a voltage potential when the user's thumbs are in a neutral or at rest position. This potential increases in amplitude proportional to the extent to which the left thumb depresses the left end of the lever and decreases in amplitude proportional to the extent that the right thumb depresses the right end of the lever;

the electric voltage potential emanating from the terminal of the potentiometer 42 is electrically connected to the resistor—capacitor circuit 52 working in conjunction with the astable oscillator circuit 50 and effects a modulation of the voltage potential, to produce an output of repetitive pulses. The oscillator circuit 50 generates repetitive pulses with the on-time of each pulse being 1500 microseconds long when the lever 7 is in the neutral position, decreasing the on-time as the lever rotates clockwise and increasing the on-time as the lever rotates counter-clockwise. The on-time of the pulse is an indicator of the lever's angular positon;

the servo motor 40 uses the information contained in the repetitive pulses 76 produced from the oscillator circuit 50 and provides angular position of its output shaft 77, maintaining it in the middle of its total range of 270 degrees when the on-time of the pulse is 1500 microseconds, rotating it clockwise as the on-time of the pulse decreases and rotating it counter-clockwise as the on-time of the pulse increases. Preferably the servo motor output shaft 77 duplicates in reverse the movements of the control lever 7;

the servo motor output shaft 77 is coupled to the stem 32. The stem 32 mechanically supports the friction wheel 36, so that it maintains constant frictional contact with the rotative outer surface 24 of the cylinder 20, and it causes the friction wheel to pivot and follow a path 100 on the rotating cylinder surface. The stem angle applied controls the nature of the path and varies the distance between the start and end points of the path through each revolution of the cylinder 20. When the friction wheel 36 is angled, continuous revolution of the cylinder 20 produces a path 100 that is helical in nature so that the friction wheel 36 advances linearly and laterally along the cylinder 20;

the rate of spinning of the cylinder 20, which is coupled to the directional wheel 4, is affected by the rate of the vehicle speed; as a consequence, the friction wheel 36 moves slowly along the cylinder when the vehicle is moving slowly and quickly when the vehicle is moving quickly;

the slide body 31 is coupled by the telescopic coupling 53 with the directional wheel column 58, to thereby provide turning of the directional wheel 4. The telescopic coupling 53 functions to hold the directional wheel 4 in a straight ahead direction when the friction wheel 36 is centrally located on the cylinder 20; it turns the directional wheel clockwise as it advances to the left and turns it counter-clockwise as it advances to the right.

In summary, the control lever 7 movements control the rate at which the friction wheel 36 advances along the cylinder 20 by altering the width of the helical travel path 100. Pushing on the right lever end causes the friction wheel 36 to travel left along the cylinder 20 and turns the directional wheel 4 to the right. Pushing on the left lever end causes the friction wheel 36 to travel right along the cylinder 20 and turns the directional wheel 4 to the left. At any time, if the control lever 7 is returned to the even or neutral position, the friction wheel 36 stops advancing and holds the directional wheel 4 at its current position.

The Tricycle and Rowing-Type Assembly

The steering system 1 is shown mounted to a user-powered tricycle 5. The tricycle 5 is equipped with a rowing-type assembly 61, which enables the user 6 to manually propel the vehicle. The steering system 1 enables the user 6 to digitally actuate and control turning and orientation of the directional wheel 4, to thereby steer the tricycle.

In greater detail, the tricycle 5 comprises a main frame 62 connected with the rotatably and pivotably mounted front directional wheel 4 and a pair of spaced apart rear wheels 63,64 which are rotatably mounted on rear axles 65 and 65a connected to the main frame 62. The main frame 62 further incorporates a slide platform 66 on which a user seat 67 is slidably mounted. A foot rest 68 is secured to the main frame 62 at its forward end. A pull cable 69 extends over sheaves 70, 71, attached to the main frame 62, from a hub 78a and is attached to the rear axle 65 by a chain 79. A bar handle 73 is attached to the free end 74 of the pull cable 69 and serves as a support to which the control lever 7 is mounted.

EXAMPLE

The described system 1 provides the following steering options when operationally mounted to the tricycle 5, as shown in FIGS. 1, 3 and 5a:

a) by holding the control lever 7 steady and symmetrically, the rim of the friction wheel 36 is parallel to the direction of rotational movement of the cylinder outer surface 24 and turning of the directional wheel 4 is not occurring—the directional wheel 4 traces a constant path on the ground and the status is static;

b) by holding opposing digits steadily and not symmetrically to the control lever 7, the lever 7 is angled, the rim of friction wheel 36 and the direction of rotational movement of the cylinder outer surface 24 are angled to each other and not turning, the friction wheel 36 advances at a constant rate along the cylinder 20, there is constant progression of turning of the directional wheel 4, the vehicle path radius is changing and the status is dynamic; and c) by articulating opposing digits and thereby pivoting the control lever 7, the rim of the friction wheel 36 and the direction of rotational movement of the cylinder outer surface 24 are angled relative to each other and turning, the friction wheel 36 advances along the cylinder 20 at a changing rate, thereby changing the speed at which the directional wheel 4 turns, which determines how quickly or slowly the vehicle path radius changes, and the status is dynamic.

Figure 2:
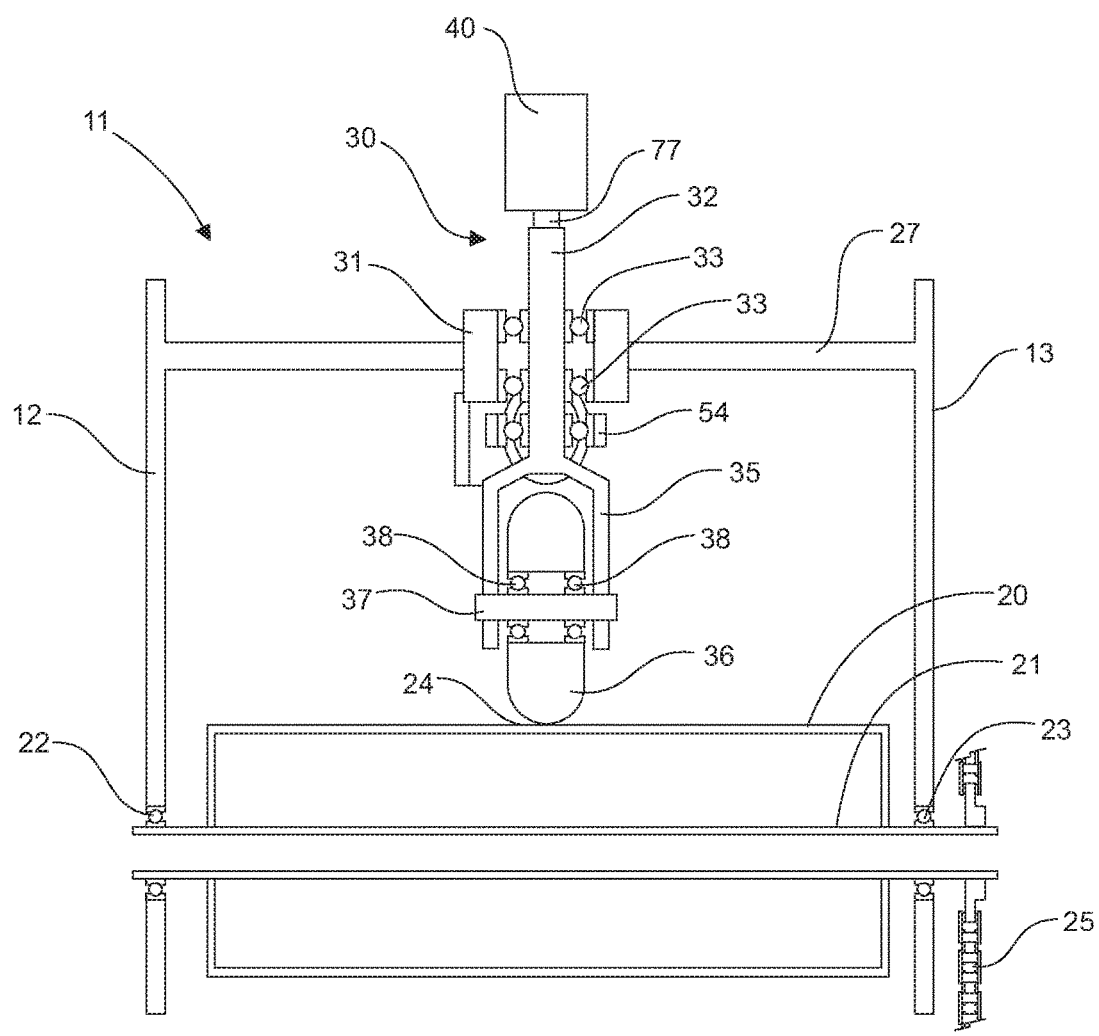
FIG. 2 is a cross cut illustration of the convertor assembly of FIG. 1.
Figure 8:
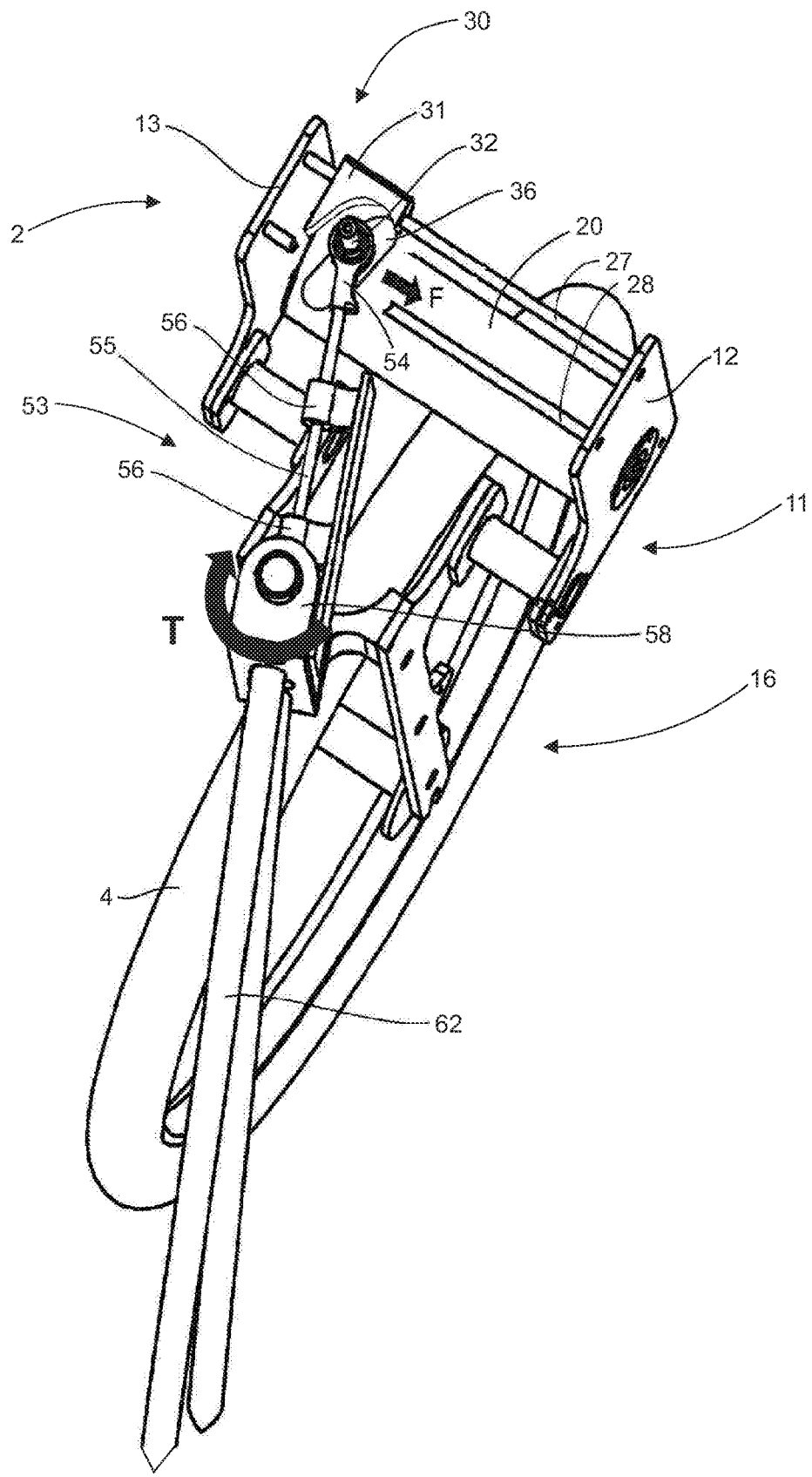
FIG. 8 is a perspective top view of the mounted converter assembly with the arrows indicating lateral force (F) and steering torque (T) while turning right.
Figure 9:
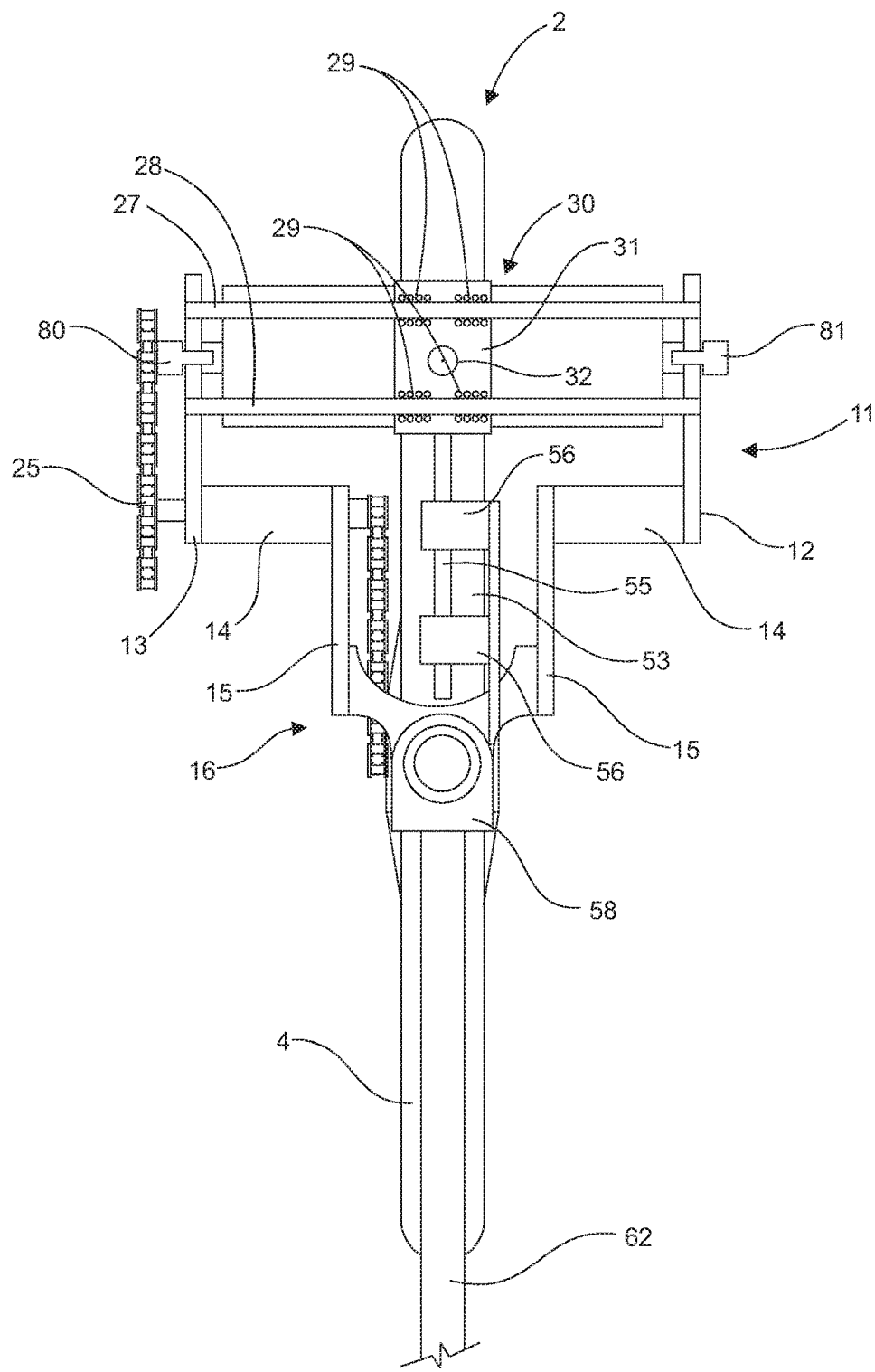
FIG. 9 is a top sectional elevation illustrating the position of the slide assembly while the vehicle is proceeding in a straight forward direction.
Figure 10:
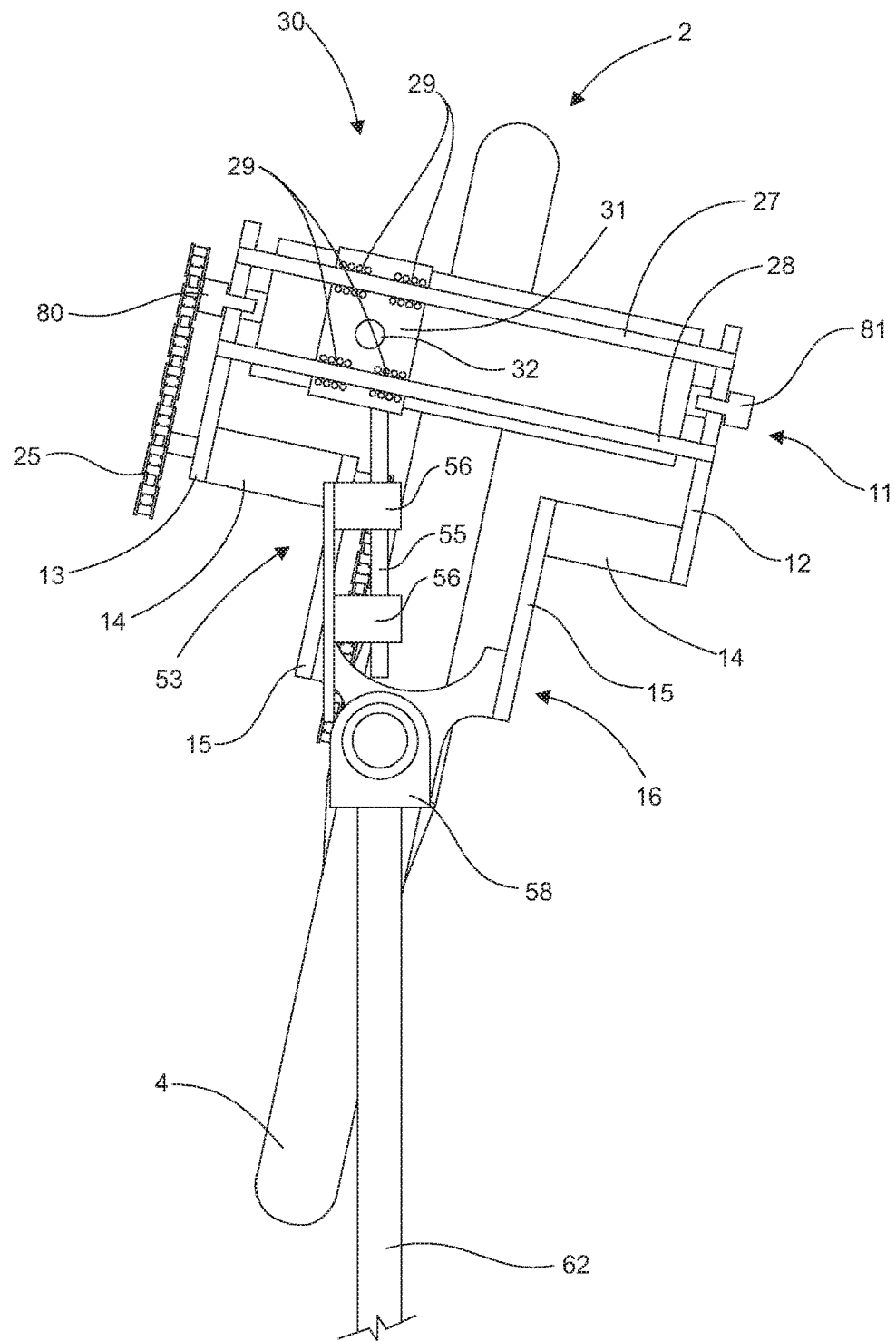
FIG. 10 is a top sectional elevation illustrating the positon of the slide assembly while the vehicle is turning to the right.
Figure 11:
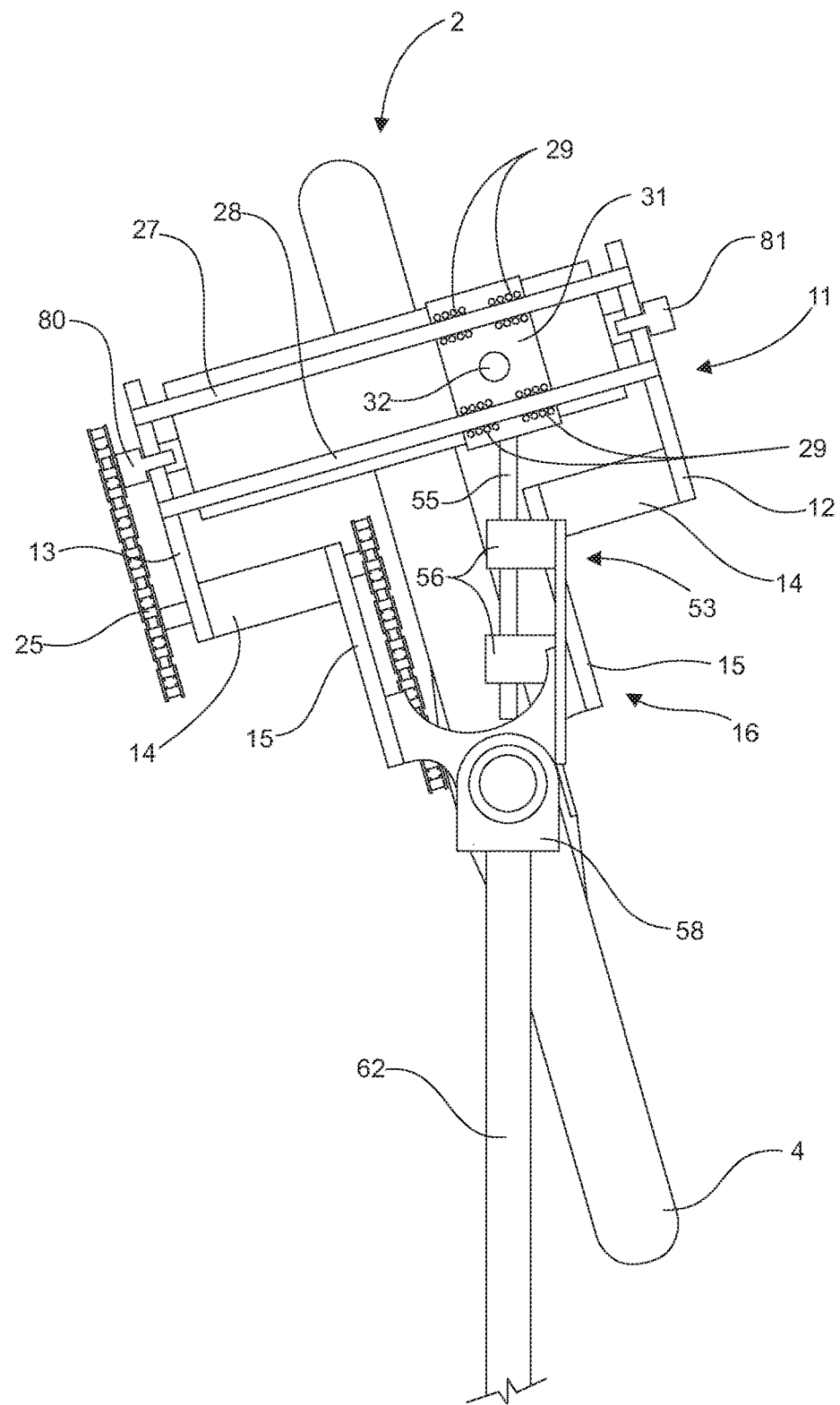
FIG. 11 is a top sectional elevation illustrating the position of the slide assembly while the vehicle is turning to the left.
Figure 12:
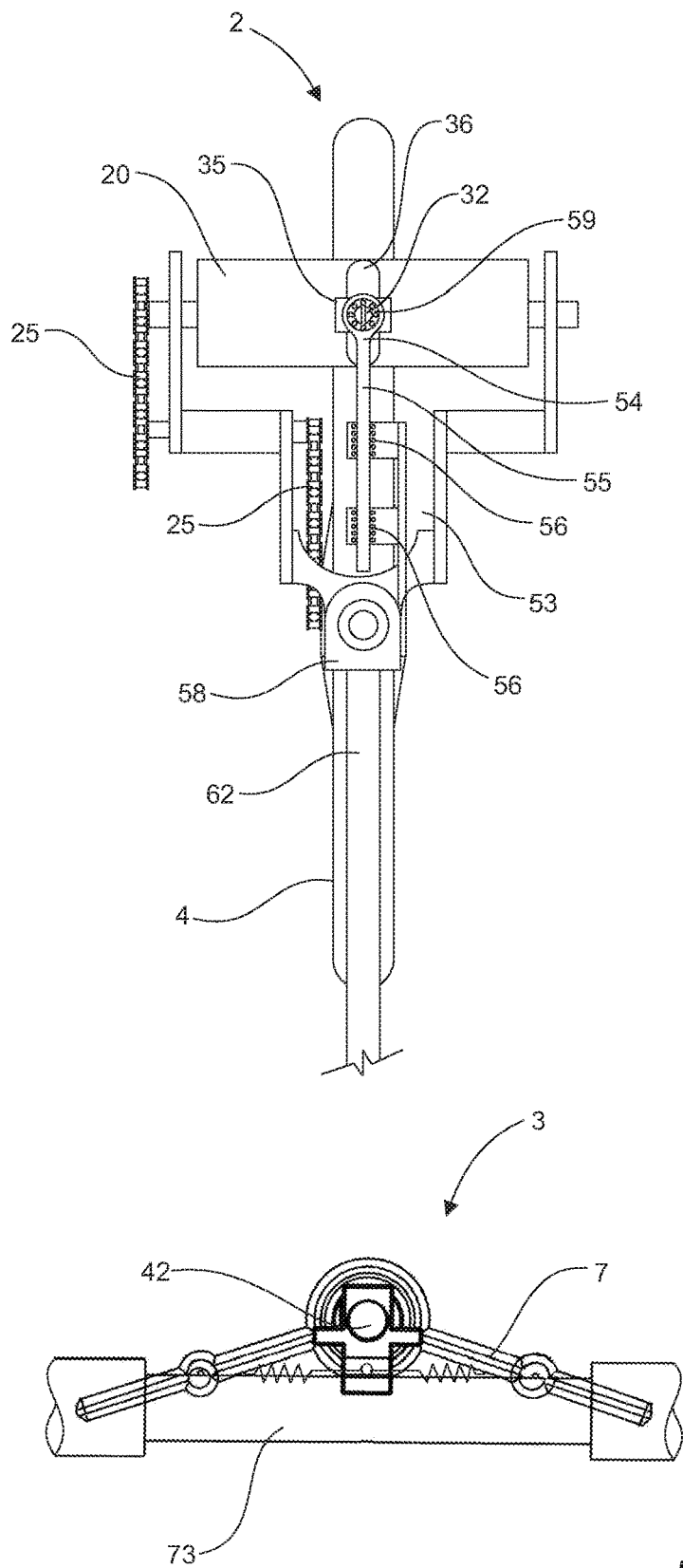
FIG. 12 is a top sectional elevation illustrating the angular positions of the friction wheel and the control lever while the vehicle is in a straight forward direction.
Figure 13:
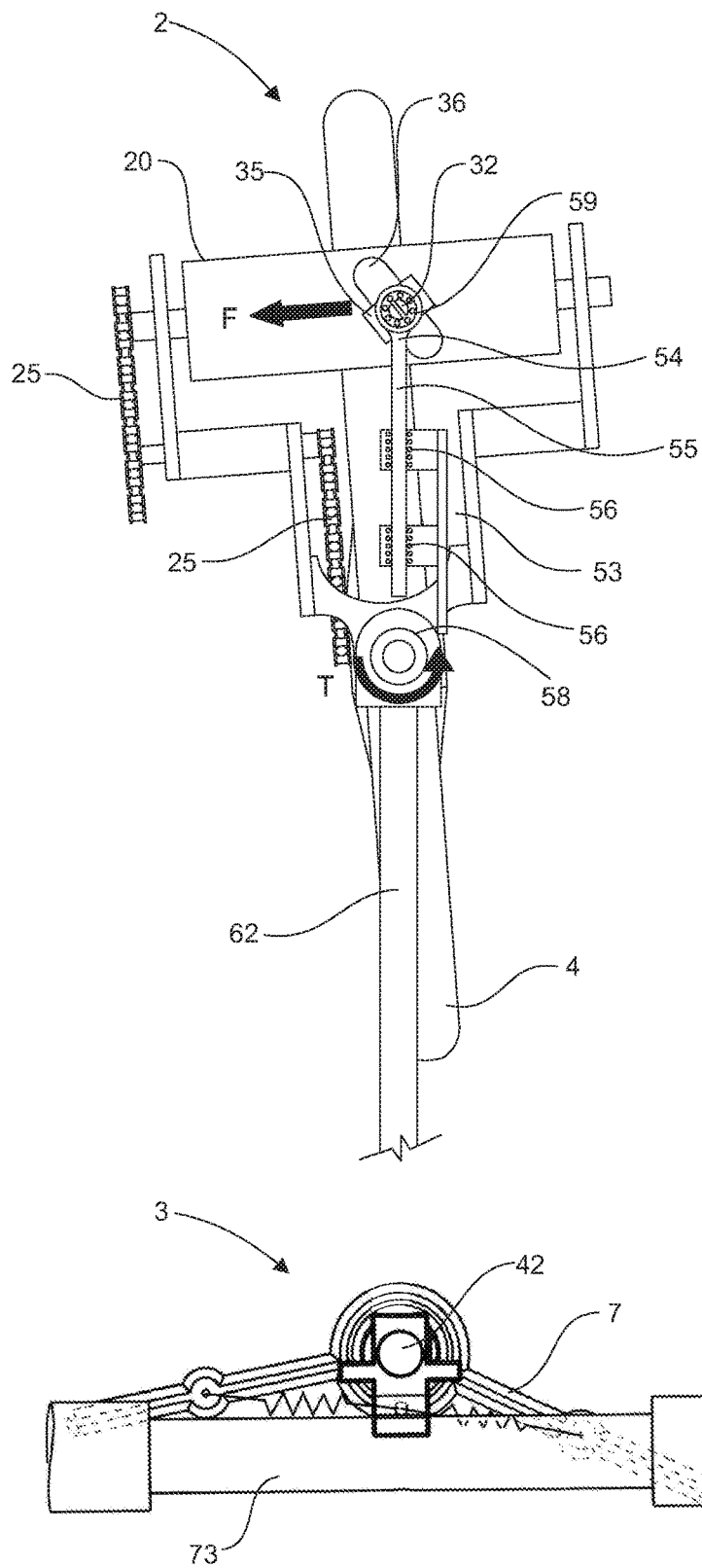
FIG. 13 is a top sectional elevation illustrating the angular positions of the friction wheel and the control lever while the vehicle is in initial phase of a left turn—the arrows indicate lateral force (F) and steering torque (T)
Figure 14:
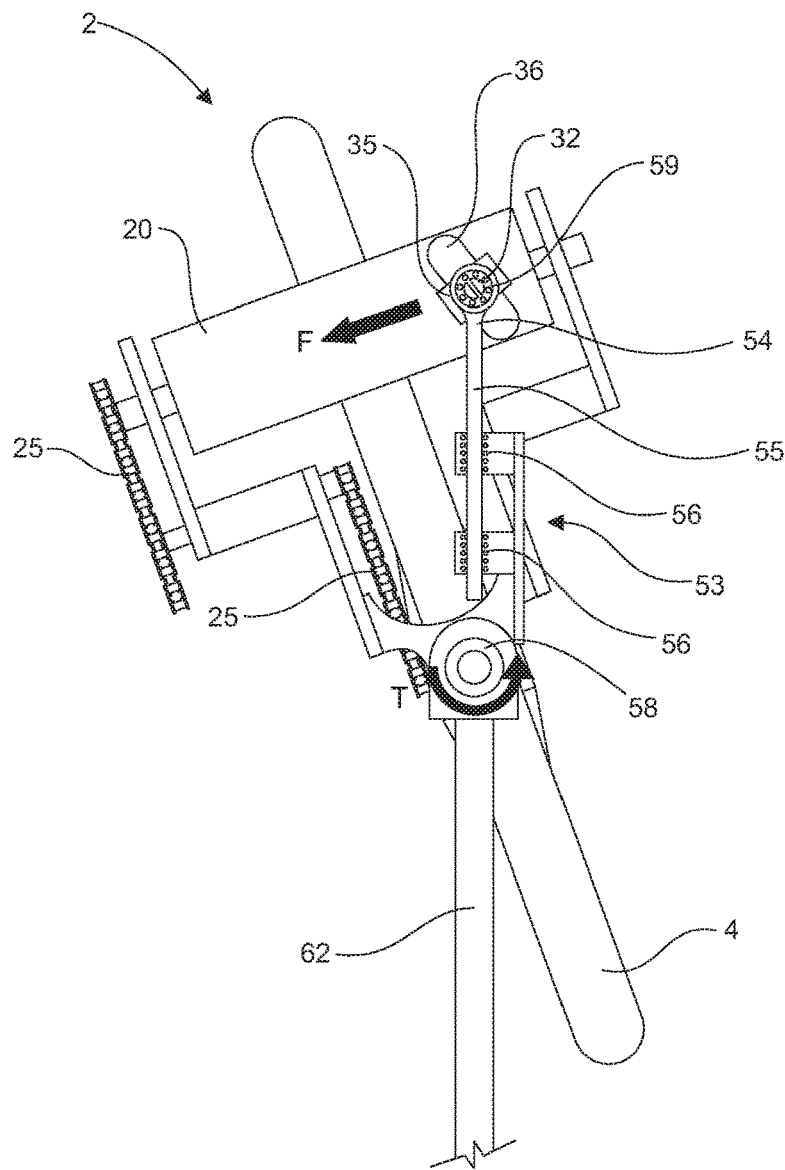
FIG. 14 is a top sectional elevation illustrating the angular positions of the friction wheel and the control lever while the vehicle continues to turn left—the arrows indicate lateral force (F) and steering torque (T)
Figure 14:
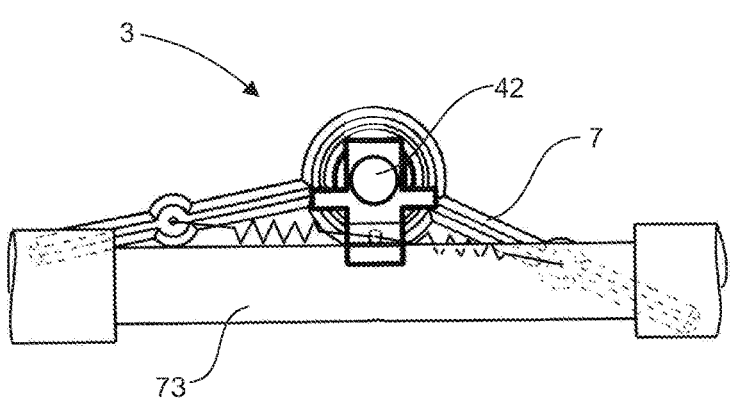
Figure 15:
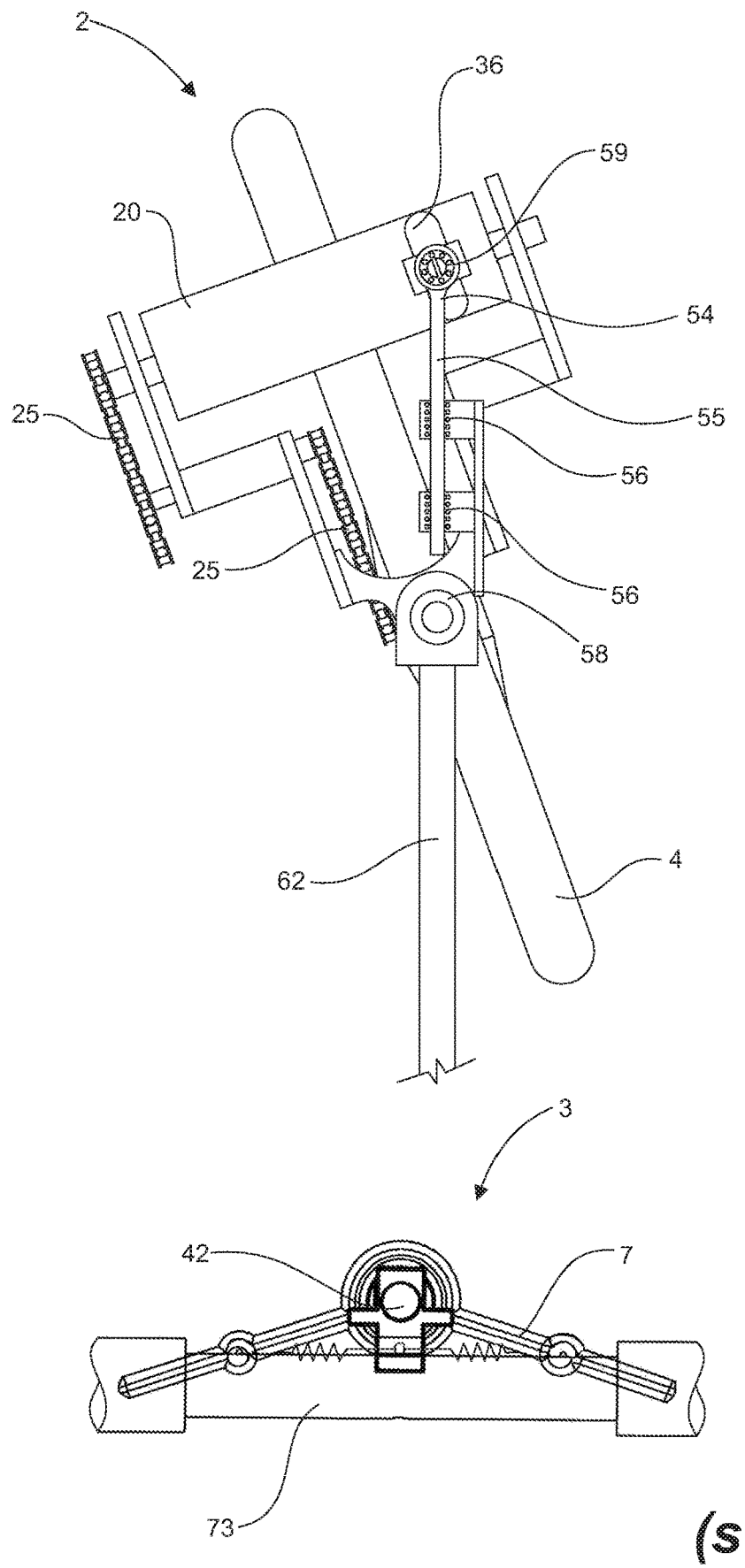
FIG. 15 is a top sectional elevation illustrating the angular positions of the friction wheel and the control lever while the vehicle is proceeding at a constant left turn.
Figure 16:
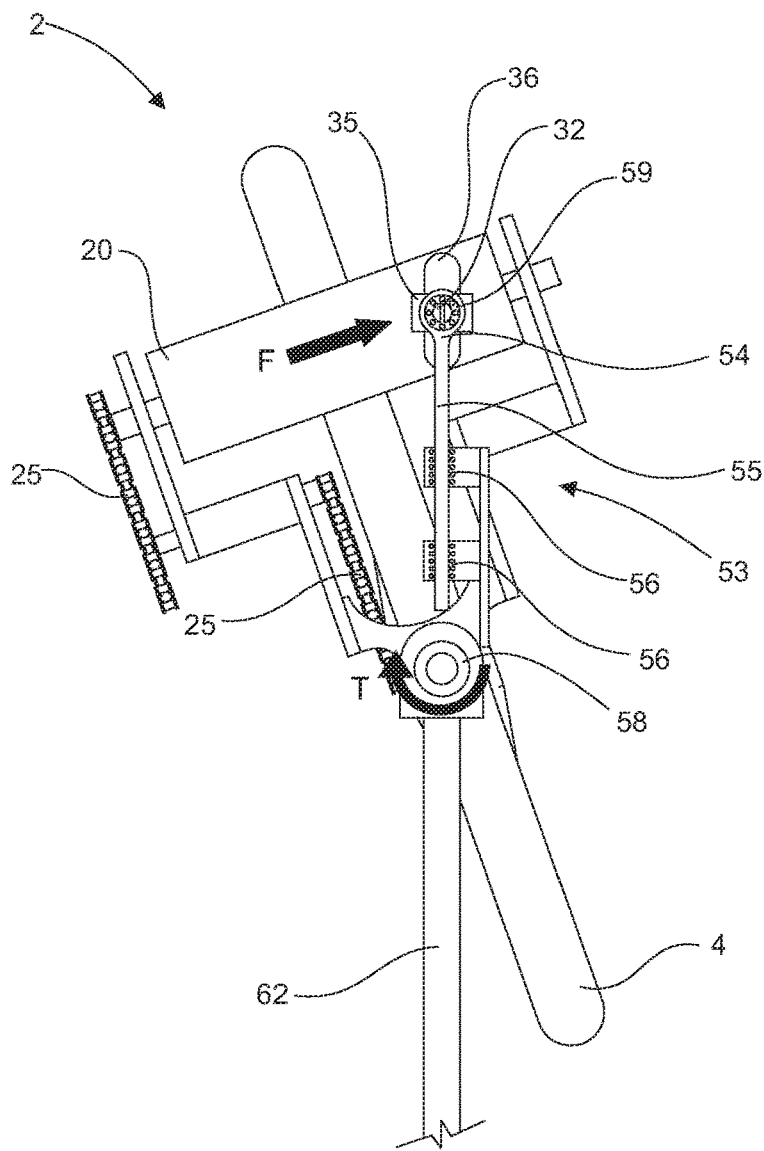
FIG. 16 is a top sectional elevation illustrating the angular positions of the friction wheel and the control lever while the vehicle is turning to the right—the arrows indicate lateral force (F) and steering torque (T)
Figure 16:
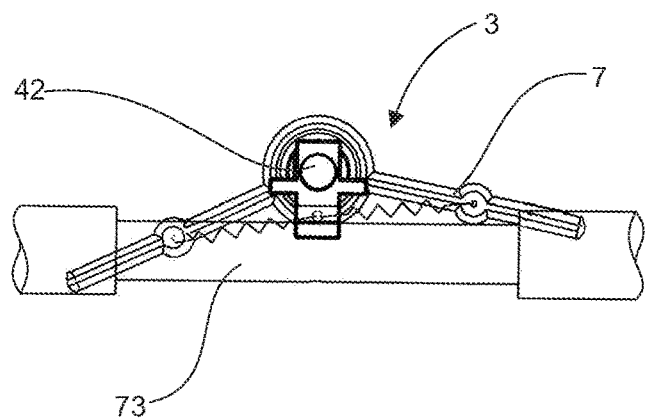
Figure 17:
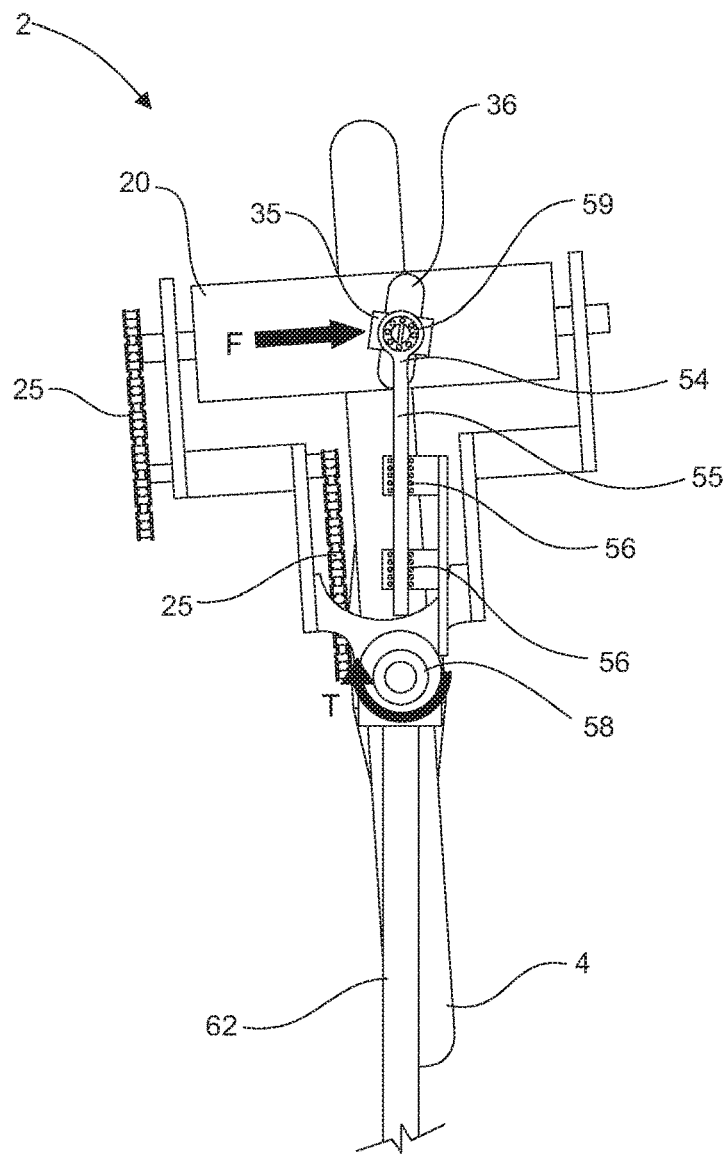
FIG. 17 is a top sectional elevation illustrating the angular positions of the friction wheel and the control lever while the vehicle continues to turn right—the arrows indicate lateral force (F) and steering torque (T)
Figure 17:
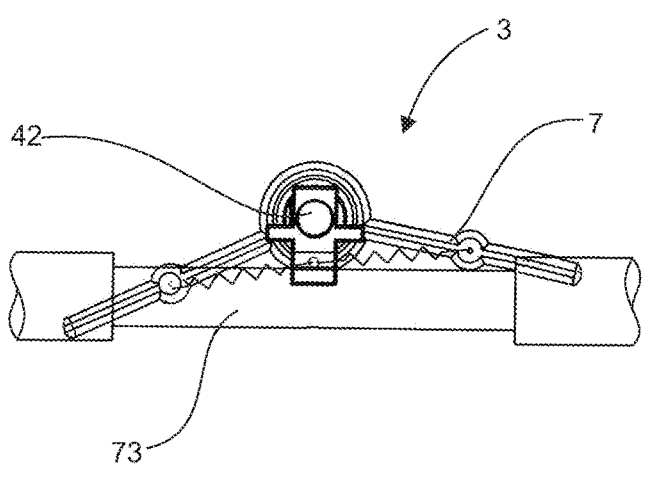
Figure 18:
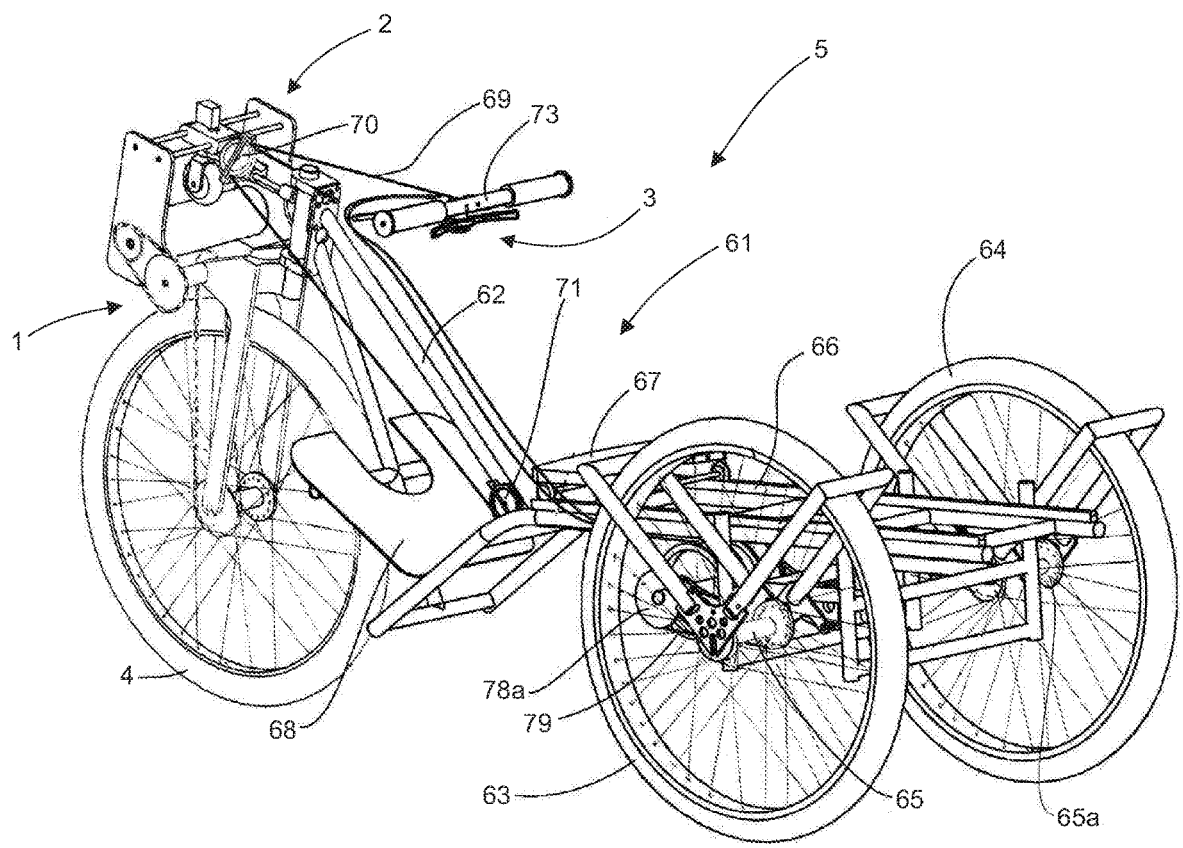
FIG. 18 is a projection illustration of the steering system mounted to an exercise tricycle equipped with a rowing type system, showing the pull handle bar connected to a flexible cord which provides propulsion to the rear wheel when pulled.
Figure 19:
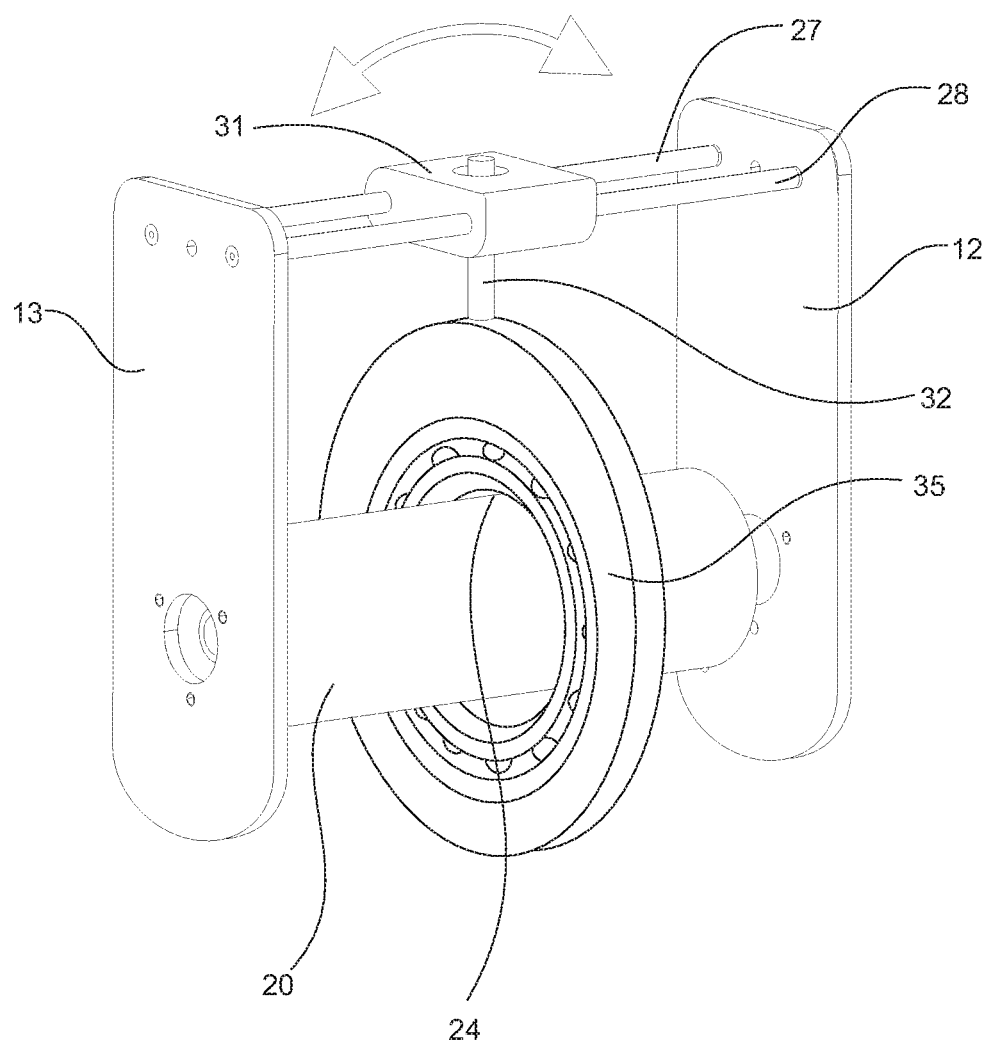
FIG. 19 is a partial perspective illustration of an alternative annular embodiment of the friction wheel having an inner rim running on the rotative surface of the cylinder.
Figure 20:
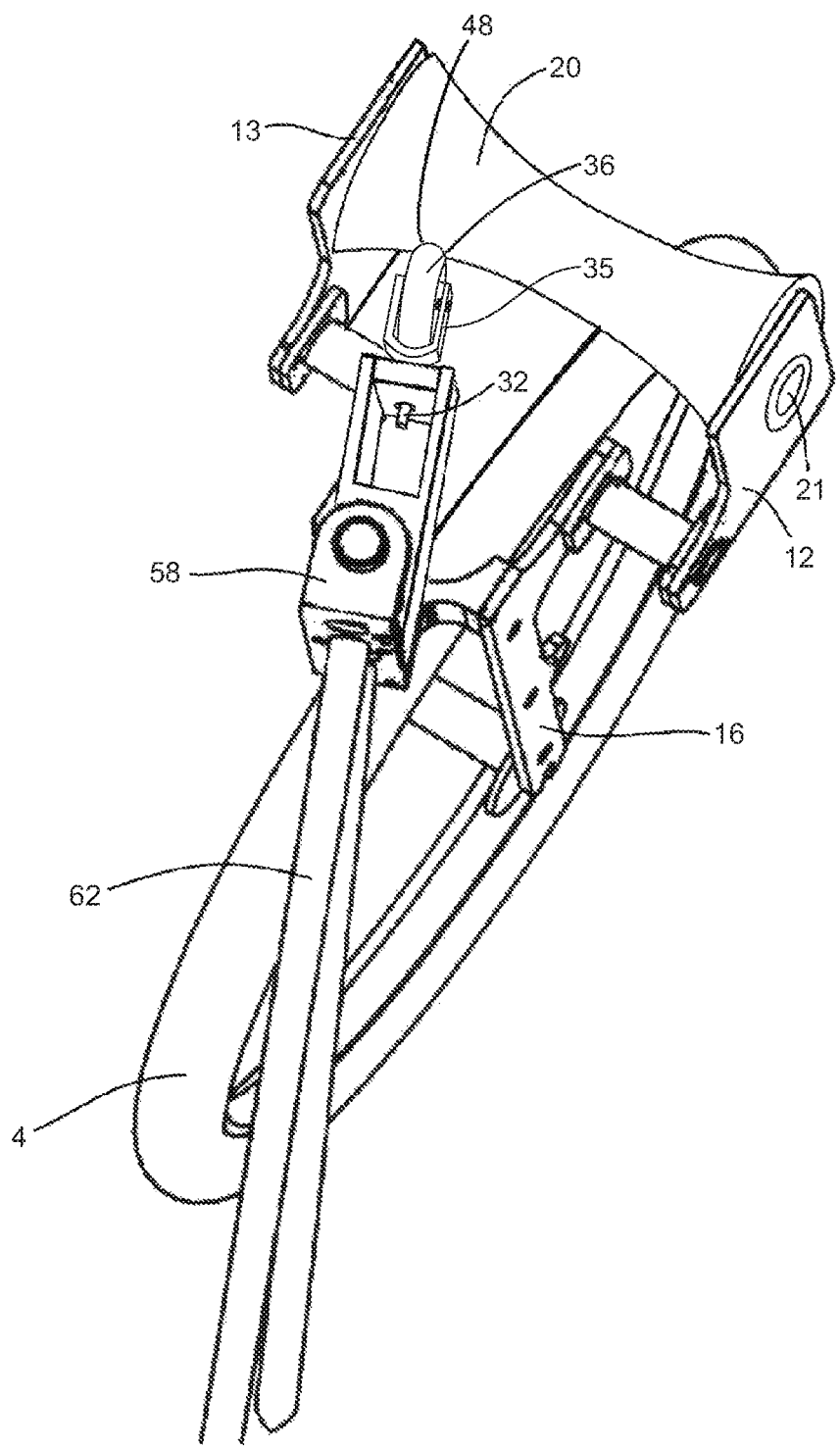
FIG. 20 is a perspective view illustrating a cylinder having a curved rotative surface.

FIG. 2b describes the operation of the steering system in connection with following a FIG. 8 travel path.

Cylinder 20 provides a curved surface which friction wheel 36 engages. Alternatively a treadmill having an endless belt may provide the flat surface on which the friction wheel 36 engages,

What is claimed is:
1. A steering system comprising:
a rotatable and pivotable directional wheel;
a rotary to variable linear converter assembly comprising
a rotatable cylinder, having an outer surface, and a rotatable pivotable friction wheel contacting said outer surface so that they will rotate together as a coupled unit;

said converter assembly further comprising guide means, for constraining and guiding movement of the friction wheel along the cylinder outer surface, and a slide assembly connected to and moveable along the guide means;

the slide assembly having a rotatable stem connected with the friction wheel for pivotally varying the friction wheel's orientation;

the slide assembly and friction wheel forming a moveable assembly connected with the directional wheel for turning it;

a source of rotational drive connected with the coupled unit for driving it; and user controllable means, connected with the stem, for actuating rotation of the stem to vary the friction wheel orientation for the purpose of steering the directional wheel.

2. A system for enabling a user to digitally steer a rotatable pivotable directional wheel of a manually powered vehicle, comprising:

a rotary to linear converter assembly mounted to the vehicle and connected to the directional wheel for steering thereof, said converter assembly comprising a rotatable cylinder having an outer surface and a rotatable pivotable friction wheel contacting said outer surface so that they will rotate together as a coupled unit, said converter assembly further comprising guide means, for constraining and guiding movement of the friction wheel along the cylinder outer surface, and a slide assembly connected to and moveable along the guide means, the slide assembly having a rotatable stem connected with the friction wheel for pivotally varying the friction wheel's orientation, the slide assembly and friction wheel forming a moveable assembly connected with the directional wheel for turning it;

a source of rotational drive associated with the vehicle and connected with the coupled unit for driving it; and user digit controllable means, connected with the stem, for actuating rotation of the stem to vary the friction wheel orientation for the purpose of steering the directional wheel.

3. The system as set forth in claim 2 wherein the friction wheel is positioned normal to the cylinder's outer surface and is moveable across the direction of movement of said outer surface when the cylinder is rotating.

4. The system as set forth in claim 3 wherein the digitally operable means comprises:

a control lever pivotally mounted to a support member carried by the vehicle so that its lever ends may be biased into an angled configuration or maintained even, and means for monitoring the control lever movements and actuating the stem to provide angular positioning thereto indicative of said movements for turning the friction wheel.

5. The system as set forth in claim 4 wherein:

the direction of the control lever movements controls the direction of movement of the friction wheel;

the angular magnitude of the control lever movements controls the rate of movement of the friction wheel; and the angular rate of lever movements controls the acceleration of movement of the friction wheel.

6. A system for steering a rotatable and pivotable directional wheel of a vehicle, comprising:

a rotary to variable linear converter assembly mountable to the vehicle and connectable to the directional wheel for steering said wheel when it is rotating by generating and applying lateral force to provide torque for holding said wheel steady or turning it;

said converter assembly comprising a rotatable cylinder and a guided, laterally moveable, pivotable and rotatable friction wheel maintained in contact with the cylinder's surface so that they rotate together; and digitally controlled means connected with the friction wheel for turning or holding steady the friction wheel relative to the axis of the cylinder.

* * * * *